United States Patent [19]
Caren et al.

[11] Patent Number: 6,047,543
[45] Date of Patent: Apr. 11, 2000

[54] METHOD AND APPARATUS FOR ENHANCING THE RATE AND EFFICIENCY OF GAS PHASE REACTIONS

[75] Inventors: Robert P. Caren, Westlake Village, Calif.; David Christeller, Clarkson, Mich.; Jack A. Ekchian, Belmont, Mass.

[73] Assignee: Litex, Inc., Cambridge, Mass.

[21] Appl. No.: 09/122,394

[22] Filed: Jul. 24, 1998

Related U.S. Application Data

[63] Continuation-in-part of application No. 08/947,287, Oct. 7, 1997, which is a continuation-in-part of application No. 08/768,833, Dec. 18, 1996, Pat. No. 5,863,413.

[51] Int. Cl.[7] ........................................ F01N 3/00
[52] U.S. Cl. ............................ 60/275; 60/274; 60/287; 60/288; 60/308; 422/186.04; 204/177
[58] Field of Search .................. 60/274, 275, 276, 60/301, 303, 304, 287, 288, 308; 422/168, 169, 186.04; 204/168, 173, 177

[56] References Cited

U.S. PATENT DOCUMENTS

| | | | |
|---|---|---|---|
| 1,333,836 | 3/1929 | Csanyi . | |
| 1,725,566 | 8/1929 | McPartland . | |
| 1,982,484 | 11/1934 | Runge . | |
| 3,188,167 | 6/1965 | Specht . | |
| 3,896,616 | 7/1975 | Keith et al. | 60/274 |
| 3,979,193 | 9/1976 | Sikich . | |
| 4,041,922 | 8/1977 | Abe et al. . | |
| 4,309,199 | 1/1982 | Suzuki . | |
| 4,434,771 | 3/1984 | Slmnicki . | |

(List continued on next page.)

FOREIGN PATENT DOCUMENTS

| | | | |
|---|---|---|---|
| 5332128 | 12/1993 | Japan | 60/285 |
| WO 98/09699 | 3/1998 | WIPO . | |

OTHER PUBLICATIONS

Kintaichi et al., "Selective Reduction of Nitrogen Oxides with Hydrocarbons Over Solid Acid Catalysts in Oxygen–Rich Atmospheres," Catalysis Letters 6 (1990) 239–244.

Yasuda et al., "IR Study of Catalytic Reduction of Nitrogen Monoxide by Propene in the Prescence of Oxygen over Ce–Exchanged ZSM–5 Zeolite," Symposium on $NO_x$ Reduction Presented before the Division of Petroleum Chemistry, Inc. 207th National Meeting, American Chemical Society, San Diego, CA, Mar. 13–18, 1994, 99–102.

Liu et al., "in situ XANES Characterization of Cu in Cu–ZSM–5 during Selective Catalytic Reduction of NO by Hydrocarbon," Symposium on $NO_x$ Reduction Presented before the Division of Petroleum Chemistry, Inc. 207th National Meeting, American Chemical Society, San Diego, CA, Mar. 13–18, 1994, 107–111.

(List continued on next page.)

*Primary Examiner*—Thomas Denion
*Assistant Examiner*—Binh Tran
*Attorney, Agent, or Firm*—Pennie & Edmonds LLP

[57] ABSTRACT

An apparatus and a method for enhancing the rate of a chemical reaction in a gas stream. The apparatus includes at least one heterogeneous catalyst having an upstream end and a downstream end, and at least one surface having a plurality of catalytically active sites on the surface, where the catalyst is positioned so that at least a portion of the gas stream contacts at least a portion of the catalytically active sites on the surface. At least one device for producing radicals or other active species from at least one of water vapor or other gaseous species, such as a corona discharge device or a UV light source is used to produce radicals or other active species, which are introduced into the gas stream at a position upstream of the downstream end of the catalyst. The radicals or other active species are introduced in an amount sufficient to reduce or eliminate poisoning of the catalyst by catalyst poisons, such as sulfur, sulfur containing compounds, phosphorous, phosphorous containing compounds, and carbon.

58 Claims, 9 Drawing Sheets

U.S. PATENT DOCUMENTS

| | | |
|---|---|---|
| 4,519,357 | 5/1985 | McAllister . |
| 4,945,721 | 8/1990 | Cornwell et al. . |
| 4,968,396 | 11/1990 | Harvey . |
| 5,097,665 | 3/1992 | Kammel . |
| 5,154,807 | 10/1992 | Harvey . |
| 5,287,556 | 2/1994 | Rich . |
| 5,410,871 | 5/1995 | Masters et al. . |
| 5,419,123 | 5/1995 | Masters . |
| 5,433,832 | 7/1995 | Rich et al. . |
| 5,474,747 | 12/1995 | Hayashi et al. ............... 422/177 |
| 5,487,874 | 1/1996 | Gibboney, Jr. . |
| 5,623,819 | 4/1997 | Bowker et al. . |
| 5,655,210 | 8/1997 | Gregoire et al. ............... 422/186 |
| 5,711,147 | 1/1998 | Vogtlin et al. . |
| 5,746,984 | 5/1998 | Hoard ............................. 422/169 |
| 5,771,683 | 6/1998 | Webb . |
| 5,891,409 | 4/1999 | Hsiao et al. . |
| 5,893,267 | 4/1999 | Vogtlin et al. . |

OTHER PUBLICATIONS

Burch et al., "Mechanism of the Selective Reduction of Nitric Oxide by Propene on Platinum–Based Catalysts in the Prescence of Excess Oxygen," Symposium on $NO_x$ Reduction Presented before the Division of Petroleum Chemistry, Inc. 207th National Meeting, American Chemical Society, San Diego, CA, Mar. 13–18, 1994, 150–153.

Hamada et al., "Transition metal–promoted silica and alumina catalysts for the selective reduction of nitrogen monoxide with propane," Applied Catalysis, 70 (1991) L1–L8.

Hamada et al., "Selective reduction of nitrogen monoxide with propane over alumina and HZSM–5 zeolite," "Effect of oxygen and nitrogen dioxide intermediate," Applied Catalysis, 70 (1991) L15–L20.

Suhr et al., "Reduction of Nitric Oxide in Flue Gases by Point to Plane Corona Discharge with Catalytical Coatings on the Plane Electrode," Combust. Sci. and Tech., vol. 72, pp. 101–115.

Penetrante et al., "Comparison of Electrical Discharge Techniques for Nonthermal Plasma Processing of NO in $N_2$," IEEE Transactions on Plasma Science, vol. 23, No. 4, Aug. 1995, 679–687.

Whealton et al., "971718 Non–Thermal Plasma Exhaust Aftertreatment: A Fast Rise–Time Concept," Manuscript based on work performed at the Oak Ridge National Laboratory, managed by Lockheed Martin Energy Research Corporation for the U.S. Dept. of Energy under contract No. DE–AC05–96OR22464, 1–14.

Fanick et al., "Simultaneous Reduction of Diesel Particulate and $NO_x$ Using a Plasma," SAE Technical Paper Series 942070, 239–246.

Hepburn et al., "The Pulse Flame Combustor Revisited," 962118 Ford Motor Co., 1–36.

Sztenderowicz et al., of Chevron Research and Technology Co. et al., "Effects of Fuel Sulfur Level on Emissons from Transitional Low Emission Vehicles," 952561, 2067–2082.

*Plasma Exhaust Aftertreatment*, SAE SP–98/1395, Library of Congress Catalog Card No. 98–86679, Copyright © 1998 Society of Automotive Engineers, Inc.

METHOD AND APPARATUS FOR ENHANCING THE RATE AND EFFICIENCY OF GAS PHASE REACTIONS

CROSS-REFERENCE TO RELATED APPLICATIONS

The present application is a continuation-in-part of co-pending U.S. patent application Ser. No. 08/947,287, filed Oct. 7, 1997 which is a continuation-in-part of U.S. patent application Ser. No. 08/768,833, filed Dec. 18, 1996 now U.S. Pat. No. 5,863,413, the teachings of which are incorporated herein in their entirety by reference.

FIELD OF THE INVENTION

The present invention is directed to a method and apparatus for improving and maintaining the performance of catalytic reactors and catalytic convertors, particularly catalytic reactors used in fuel cells for producing electricity and vehicle catalytic convertors used to reduce the emission of pollutants. More particularly, the invention is directed to a method and apparatus where the improved performance of the catalysts is achieved by producing highly oxidizing free radicals, such as hydroxyl radicals, OH, hydroperoxyl radicals, $HO_2$, atomic hydrogen, H, and atomic oxygen, O, and other active species, including related oxidizing gaseous species, such as hydrogen peroxide, $H_2O_2$, nitrogen dioxide, $NO_2$, and ozone, $O_3$, by any means known in the art, but preferably with a corona discharge, and introducing these active species into the gas stream flowing into and through a catalyst, such as the catalytic reactor fuel reformer used to produce hydrogen gas from a hydrocarbon fuel for use in a fuel cell, a catalytic combuster, or a catalytic convertor associated with an internal combustion engine.

BACKGROUND OF THE INVENTION

Heterogeneous catalysts have been shown to be useful in enhancing the rate and/or efficiency of gas phase reactions in a number of applications. These applications include emerging technologies, such as catalytic reactors or fuel reformers that are used to produce hydrogen gas, $H_2$, from hydrocarbon fuels, such as gasoline, natural gas, and alcohols, as well as relatively mature technologies, such as the catalytic convertors used to reduce the emission of pollutants from automobile and truck engines. The performance of heterogeneous catalysts may be severely degraded by exposure to catalyst poisons, such as the sulfur and phosphorous compounds that are found in varying amounts in automotive fuels, such as gasoline. As gasoline is expected to be used, at least initially, in automotive applications of fuel cells, the possible poisoning of both fuel cell catalytic reactors, automotive catalytic convertors, and other catalytic combusters by fuel contaminants is a major concern regarding the effectiveness of these devices.

Fuel cells are electrochemical devices that convert the chemical energy of a fuel directly into electrical and thermal energy, and have been used for a number of years in aerospace applications, such as the space shuttle, where hydrogen and oxygen gas are combined to produce electric power. In a typical fuel cell, a gaseous fuel, e.g., hydrogen, $H_2$, is fed continuously to an anode or negative electrode compartment, and an oxidant, e.g., oxygen or an oxygen containing gas, which is typically air, is fed continuously to a cathode or positive electrode compartment. The hydrogen and oxygen are combined at the electrodes, producing water and an electric current. In addition to water, fuel cells that utilize catalytic reactors to produce hydrogen gas from hydrocarbon fuels also release carbon dioxide, and may also release very small amounts of carbon monoxide.

Theoretically, a fuel cell is capable of producing electrical energy for as long as the fuel and oxidant are supplied to the electrodes. However, pure hydrogen is difficult to store, particularly in a vehicle, and its use may not be practical in many applications. In those cases, a catalytic fuel reformer may be used to produce hydrogen gas from a hydrocarbon fuel, and, thus, the life and performance of the fuel cell is limited by the performance and efficiency of the catalytic reactor. As discussed above, if one or more catalyst poisons are present in the fuel used to produce hydrogen in the catalytic fuel reformer, the performance of the reformer will be degraded, thereby reducing the performance of the fuel cell.

In addition, fuel cells are sensitive to carbon monoxide, and, thus, the amount of carbon monoxide is typically minimized in the fuel gas by removal by the catalytic reactor to achieve optimum efficiency of the fuel cell. However, where the catalyst is contaminated or poisoned, carbon monoxide will remain in the fuel gas after passing through the catalytic reactor. Therefore, for the fuel cell to function efficiently, the catalyst should be substantially free of poisons that prevent the removal of carbon monoxide from the fuel gas.

Similarly, in virtually all modern gasoline engines used in vehicles, such as automobiles and light trucks, the exhaust gases produced during combustion of fuel are conveyed by an exhaust pipe to a catalytic converter where pollutants, such as carbon monoxide (CO), hydrocarbons (HC), and oxides of nitrogen ($NO_x$), are substantially converted to non-polluting species, and, thus, are removed from the exhaust gas. In addition, it is expected that catalytic convertors will soon be developed for use with diesel engines. Most modern engines employ three way catalytic converters ("TWC"), which simultaneously oxidize CO and HC to $CO_2$ and $H_2O$, and reduce NO and $NO_2$ to $N_2$. The amount of CO, HC, $NO_x$ and other pollutants produced will vary with the design and operating conditions of the engine and the fuel and air used. In particular, as with fuel cell catalytic reactors, the presence of catalyst poisons in the fuel will result in a degradation of the performance of the catalytic convertor, and, thus, an increase in the amount of pollutant released into the air.

In general terms, a catalytic convertor used with an internal or external combustion engine may be considered to be a sophisticated catalytic combuster, which is typically used to enhance the oxidation of a fuel to produce heat. The heterogeneous catalyst in a catalytic combuster provides a surface on which a fuel and an oxidizer react. In a typical catalytic combuster, a vaporized fuel and air are passed over the surface of the catalyst. By providing a catalytic site for the reaction of the fuel and oxidizer, the catalyst lowers the activation energy of the reaction, allowing the reaction to occur at a lower temperature with greater efficiency. However, the presence of catalyst poisons that may be adsorbed onto the catalyst surface in any of the fuel, oxidizer, or reaction products will degrade the performance and the efficiency of the catalytic combuster by occupying active sites on the catalyst surface. This reduces the number of sites available to the fuel and oxidizer, decreasing the reaction rate.

In general terms, the heterogeneous catalysts, used in fuel cell catalytic fuel reformers or reactors, vehicle catalytic convertors, and catalytic combusters, provide a catalytic surface that enhances the reaction rate and efficiency of various gas phase reactions. Although a number of different heterogeneous catalysts are known, the heterogeneous catalysts used in catalytic reactors and catalytic convertors usually utilize a noble metal catalyst. The structure of the catalyst support may vary, depending on the application, e.g., ceramic beads that are coated with the catalytic material may be used. However, where a large throughput of gas is required, the noble metal catalyst is preferably held in a honeycomb monolithic structure, which has excellent strength and crack-resistance under physical and thermal shock.

The honeycomb construction and the geometries chosen provide a relatively low pressure drop and a large total surface area that enhances the mass transfer controlled reactions that produce fuel for the fuel cell or remove pollutants from the exhaust of an engine. The honeycomb is often set in a steel container, and protected from vibration by a resilient matting where needed. Although a single catalyst may be use, a typical modern three way catalytic convertor comprises an outer steel shell that contains at least two honeycomb catalyst "bricks", i.e., honeycomb monolithic structures holding the noble metal catalyst, as described above, where one of the bricks is mounted at the upstream, inlet end of the catalytic convertor, and the second is mounted at the downstream, outlet end of the catalytic convertor.

An adherent washcoat, frequently made of stabilized gamma alumina or corderite into which the catalytic components are incorporated, is deposited on the walls of the honeycomb. Modern three way catalytic converters for simultaneously converting all three pollutants typically utilize the precious or noble metals platinum (Pt) and rhodium (Rh), where the Rh is most responsible for the reduction of $NO_x$, while also contributing to CO oxidation, which is primarily performed by Pt. Recently palladium, Pd, which is less expensive, has been substituted for or used in combination with Pt and Rh. The active catalyst generally comprises about 0.1 to 0.15% of these metals. For other applications, where reduction of $NO_x$ is not required, so that only the oxidation of CO or HC are required, rhodium is typically not present in the catalyst. Instead the catalyst is platinum, palladium, or a combination of platinum and palladium.

Because the exhaust gases of the combustion process in most modern automotive gasoline engines tend to oscillate from slightly rich to slightly lean, an oxygen storage medium is added to the washcoat of vehicular catalytic convertors to adsorb oxygen onto the surface of the washcoat during any lean portion of the cycle, and release the oxygen for reaction with excess CO and HC during any rich portion of the cycle. Cerium Oxide ($CeO_2$) is frequently used for this purpose due to its desirable reduction-oxidation response.

The conversion efficiency of a gas phase reaction heterogeneous catalyst is measured by the ratio of the rate of mass conversion or removal of a particular constituent of interest to the mass flow rate of that constituent into the catalytic. The conversion efficiency of a catalyst is a function of many parameters including aging, temperature, stoichiometry, the presence of any catalyst poisons, such as lead, sulfur, carbon and phosphorous, the type of catalyst, and the amount of time the gases reside in or on the catalyst.

As discussed above, catalyst poisons, such as sulfur and phosphorous, degrade the performance of catalysts. The performance of catalytic convertors, catalytic fuel reformers or reactors, catalytic combustors of various types, and heterogeneous catalysts in general are affected by such poisons. Poisons, even in small concentrations, strongly bond to catalytic sites on the surface of the catalyst, and block the completion of the chemical processes that the catalyst is intended to promote. The poisoning of vehicular catalytic convertors by sulfur in gasoline has been a problem, and is expected to also be a severe problem in fuel cell catalytic reactors that are proposed for automotive applications, where the required hydrogen gas will, in all likelihood, initially be produce from gasoline.

The issue of catalyst poisoning is not new. For example, the effectiveness of automotive catalytic convertors is severely degraded by the presence of lead in gasoline. Therefore, the introduction of catalytic convertors on production automobiles in the mid-1970's required the elimination of tetra-ethyl lead as an octane enhancer in fuels. Although the elimination of the lead based octane enhancer required research into alternative octane enhancers, it did not require any major changes in the manner in which the fuel itself is refined, and, thus, the cost of eliminating tetra-ethyl lead from gasoline was not prohibitive. However, the elimination of sulfur, a naturally occurring element in crude oil, from fuel may be far more expensive.

Now that lead has been essentially eliminated from motor vehicle fuel in the United States, sulfur is the key component in gasoline responsible for the poisoning of catalysts. Sulfur, typically adsorbed in the form of oxides of sulfur, attaches or binds to catalytically active areas on the surface of the catalyst, such as those used in catalytic combusters, catalytic convertors, and catalytic fuel reformers or reactors. The adsorption of at least one of sulfur and sulfur compounds prevents the resulting poisoned areas from participating in the gas phase reaction, such as the oxidation of HC and CO, and the reduction of $NO_x$ in an automotive catalytic convertor, and thereby reduces the efficiency of the catalyst. As a result, the emission of pollutants is increased where the catalyst is used in an internal combustion engine catalytic convertor. Similarly, it is expected that the presence of sulfur in gasoline will degrade the performance of catalytic reactors used to produce hydrogen from gasoline to be used as fuel in a fuel cell.

The sulfur content of gasoline presently varies from state to state and from refinery to refinery. Where California has a limit on gasoline sulfur content of approximately 30 parts per million by weight ("ppm"), other states have much higher limits on sulfur, and, as a result, sulfur levels in fuel can exceed 900 ppm. Therefore, there has been a push within the Environmental Protection Agency ("EPA") to set a national standard for gasoline sulfur content. However, even at the proposed level of 80 ppm, a degradation of the performance and efficiency of catalytic convertors and catalytic reactors using a fuel containing that level of sulfur is expected.

Alternative methods for reducing sulfur poisoning of heterogeneous catalysts are available. For example, the catalyst may be heated to a temperature significantly higher than the normal operating temperature to decompose and/or drive off certain poisons, and thereby recover the poisoned catalyst. However, the high temperature required can significantly reduce the life expectancy of a catalytic device, and is frequently not possible during normal operation.

Attempts to remove the sulfur compounds that poison catalysts from the gas or exhaust stream before poisoning of the catalyst occurs by direct filtering or by oxidation of $SO_2$ to $SO_3$, either catalytically in the presence of oxygen, i.e., lean conditions, or in a plasma discharge, have been largely unsuccessful. While each of these methods has been explored for automotive applications, they often fail to remove any significant amount of sulfur or oxides of sulfur, and require significant amount of power. Moreover, these methods may not be feasible with fuel cell catalytic fuel reformers at all.

Therefore, a need exists for a simple, inexpensive means of maintaining the efficiency of gas phase heterogeneous catalysts, such as those used in automotive catalytic convertors, fuel cell catalytic reactors, and catalytic combusters. The present invention provides such a means.

SUMMARY OF THE INVENTION

The present invention is directed to an apparatus for enhancing the rate of a chemical reaction in a gas stream. The apparatus comprises at least one heterogeneous catalyst having an upstream end, a downstream end, and at least one surface having a plurality of catalytically active sites on the surface, and at least one device for producing radicals or other active species from water vapor and/or other gaseous species, such as an ultra violet light source, a corona discharge device, or any other means known in the art for forming radicals or other active species in a gas stream. The catalyst is positioned so that at least a portion of the gas stream contacts at least a portion of the catalytically active sites on the surface, and the radicals or other active species are introduced into the gas stream at a position upstream of the downstream end of the catalyst. The at least one device for producing radicals or other active species from water vapor and/or other gaseous species may be positioned within the gas stream, such that radicals are produced directly in the gas stream, or it may be positioned remotely, producing the radicals or other active species either from a portion of the gas stream that has been diverted to the remote device or from some other source of gas.

Preferably, the radicals or other active species are introduced in an amount sufficient to reduce or eliminate poisoning of the catalyst by catalyst poisons, such as sulfur, sulfur containing compounds, phosphorous, phosphorous containing compounds, or carbon.

Typically, the catalyst is a part of a fuel cell catalytic reactor, an automotive catalytic convertor, or a catalytic combuster. Where, the gas stream is an exhaust stream from an internal combustion engine. The internal combustion engine may be a stoichiometric engine, a lean burn engine, a diesel engine, or any other known type of engine.

For use with an internal combustion engine, the apparatus of the invention may further comprise a catalytic convertor, having an inlet and an outlet, and comprising the at least one catalyst, where the catalytic convertor is positioned such that at least a portion of the exhaust stream from the engine passes through the catalytic convertor. Typically, an exhaust pipe is attached to the inlet of the catalytic convertor, such that at least a portion of the exhaust gas stream passes through the exhaust pipe to and through the catalytic convertor and the at least one catalyst, and at least one of the catalytic convertor or the exhaust pipe comprises a fitting for positioning a device for producing radicals or other active species in the exhaust stream or a portion thereof, so that a radicals or other active species are produced in the exhaust stream upstream of the downstream end of at least one catalyst in the catalytic convertor. To prevent water that may condense during cool down, the at least one device for producing radicals or other active species may be positioned on top of the exhaust pipe or catalytic convertor.

The at least one device for producing radicals or other active species is preferably a corona discharge device, having a power supply. Preferably, the corona discharge device and the power supply are each designed to have a mechanical natural resonant frequency significantly higher than that produced by the internal combustion engine. Preferably, the power supply is a low power power supply, typically producing no more than about 200 watts of power, preferably no more than about 100 watts of power, most preferably no more than about 30 watts of power.

The corona discharge device may be positioned such that naturally occurring pressure fluctuations in the exhaust stream provide a pumping action that forces exhaust gas into the corona discharge device, and scavenges gases containing radicals produced in the corona discharge from the corona discharge device. To increase the benefit obtained from these pressure fluctuations, a plenum may be positioned adjacent to the corona discharge device, such that exhaust gas pass from the exhaust pipe, through the corona discharge, into the plenum, and back into the exhaust pipe.

The apparatus of the invention may also comprise a device for injecting air into the exhaust stream during fuel rich cold start operating conditions, such that the corona discharge causes the combustion of residual fuel in the exhaust stream.

The apparatus of the invention may also utilize a remote device for generating the radicals and other active species. With an internal combustion engine, this embodiment further comprises an exhaust pipe attached to the inlet of the catalytic convertor, a tailpipe attached to the outlet of the catalytic convertor, such that at least a portion of the exhaust stream passes from the exhaust pipe to and through the catalytic convertor and through the tailpipe. The tailpipe has an exhaust gas takeoff for conveying a portion of the exhaust stream to a remote radical generator, which comprises the at least one device for producing radicals or other active species in the exhaust gas in the portion of the exhaust stream conveyed to the remote radical generator. An output from the remote radical generator returns the exhaust gas containing radicals or other active species from the remote radical generator to the exhaust stream at a point upstream of the downstream end of at least one catalyst in the catalytic convertor, where the exhaust gas containing radicals is injected into the exhaust stream.

In a further embodiment, the invention is directed to an apparatus for reducing at least one pollutant in an exhaust gas stream containing an exhaust gas formed from the combustion of fuel in a combustion gas stream, which comprises a precombustion gas stream and the exhaust gas stream. The combustion gas stream may be that of a catalytic combuster, internal or external combustion engine, furnace, boiler, fuel cell catalytic fuel reformer, electrical power generator, or any other device that obtains energy from the combustion of fuel to which a catalyst can be adapted to reduce the emission of pollution.

The apparatus comprises at least one catalyst, having an upstream end and a downstream end, where the at least one catalyst is positioned such that at least a portion of the exhaust gas stream passes through the at least one catalyst, and at least one device for producing radicals or other active species from water vapor or other gaseous species positioned in the combustion gas stream, wherein the radicals are introduced into the combustion gas stream upstream of the downstream end of the at least one catalyst. Preferably, the device for producing radicals or other active species is a corona discharge device.

In a further embodiment, the apparatus is directed to a fuel cell catalytic reformer comprising a partial oxidation stage, a catalytic reactor stage, and a preferential oxidation stage, wherein the radicals or other active species are introduced into at least one of the partial oxidation stage, catalytic reactor stage, or preferential oxidation stage comprises a catalyst. As with the embodiments described above, the at least one device for producing radicals or other active species is preferably a corona discharge device. The device for producing radicals or other active species is positioned within the gas stream, or may be positioned remotely.

The present invention is also directed to a method of enhancing a gas phase chemical reaction in a gas stream. The method comprises contacting the gas stream with at least one heterogeneous catalyst having an upstream end, a downstream end, and at least one surface having a plurality of catalytically active sites, such that at least a portion of the gas stream contacts at least a portion of the catalytically active sites, forming radicals or other active gaseous species either directly in the gas stream or in a remote generator; and introducing the radicals or other active gaseous species into the gas stream at a point upstream of the downstream end of the catalyst. Preferably, the radicals or other active species are introduced into the gas stream whenever the gas stream is in contact with the catalyst, i.e., the radicals or other active species are introduced starting with the initial use of the catalyst. This is known as time zero injection.

DETAILED DESCRIPTION OF THE PREFERRED EMBODIMENTS

Figure 1:
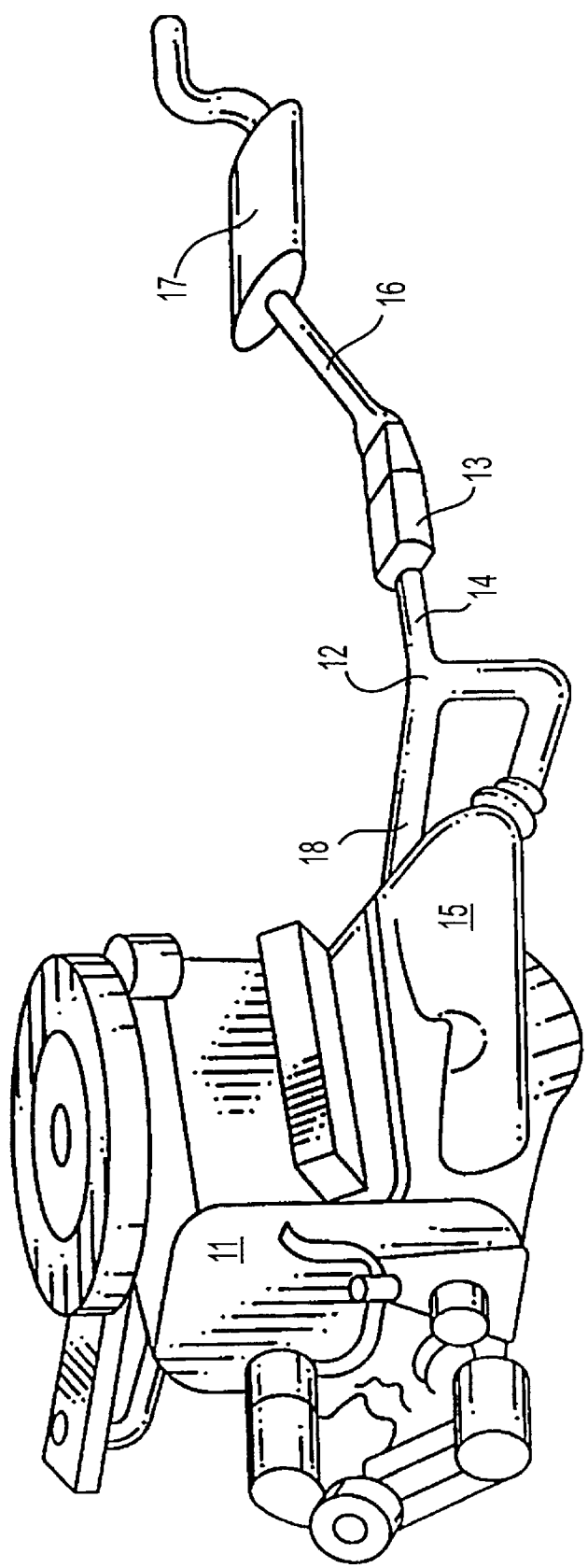
FIG. 1 is a side perspective view of an internal combustion engine having a catalytic converter.

As used herein the term "gas stream" refers to any flow of gas to, from, through, or over an article or device. The term "upstream" refers to a position in the gas stream located relative to a second position in the gas stream in the direction opposite to the flow of the gas stream, i.e., in the direction of the source of the gas stream, and the term "downstream" refers to a position in the gas stream located relative to a second position in the gas stream in the direction of the flow of the gas stream. Therefore, where a point is located upstream of, e.g., a catalyst or a part of a catalyst, the point is positioned in the gas stream between the catalyst or part of the catalyst and the source of the gas, and, where a point is located downstream of, e.g., a catalyst or a part of a catalyst, the catalyst or part of the catalyst it is positioned in the gas stream between the source of the gas and the point.

As used herein, the term "pre-combustion gas stream" refers to the flow of air or of the air/fuel mixture to the combustion chamber. The terms "postcombustion gas stream" and "exhaust gas stream", as used herein, refer to the resulting flow of exhaust gases from the combustion chamber following combustion or oxidation of the air/fuel or oxidant/fuel mixture. The pre-combustion and postcombustion gas streams are collectively referred to as the "combustion gas stream".

As used herein, the term "catalytic combuster" refers to any device in which a fuel is combusted or oxidized on the surface of a heterogeneous catalyst. That is, any device in which the reaction of a fuel and oxidizer is enhanced by contact with a heterogeneous catalyst.

In addition, the terms "radical" or "radicals" and "free radical" or "free radicals" refer to any atom or group of atoms having at least one unpaired electron and no net electrical charge; i.e., as used herein, these terms refer to electrically neutral species having equal numbers of electrons and protons, such as hydroxyl radical, OH, and hydrogen and oxygen atoms, H and O respectively, which may also be represented by OH˙, H˙, and O˙, where "˙" represents the unpaired electron.

As used herein, the terms "gas phase heterogeneous catalyst" and "heterogeneous catalyst" refer to any non-gaseous catalytic material having a surface that enhances the rate or efficiency of a gas phase reaction. i.e., a chemical reaction that alters the chemical structure of at least one gaseous chemical species.

As used herein the terms "automotive catalytic convertor" and "vehicular catalytic convertor" refer to any catalytic device that may be used to reduce the emission of pollutants produced by the combustion of fuel in the engine of an automobile, truck, or motorcycle, or any other type of vehicle or device that uses an internal or external combustion engine as a source of power.

As used herein, the term "introduction of radicals into the gas stream" includes the introduction of radical and/or related oxidizing species that were produced in a remote radical generator and the direct in situ production of radicals and/or oxidizing species directly in the gas stream.

The present invention is directed to an apparatus and method for enhancing the rate and efficiency of gas phase reactions within a gas stream and for maintaining and improving the efficiency and performance of the heterogeneous catalysts used to enhance the rate of such gas phase reactions. Typically, the heterogenous catalysts are of the type found in catalytic combusters, fuel cell catalytic reformers, and automotive catalytic convertors.

In the present invention, highly oxidizing free radicals, such as hydroxyl radicals, OH, hydroperoxyl radical, $HO_2$, atomic hydrogen, H, and atomic oxygen, O, and other active species, including related oxidizing gaseous species, such as hydrogen peroxide, $H_2O_2$, nitrogen dioxide, $NO_2$, and ozone, $O_3$, are produced in or added to a gas stream, such as, e.g., the combustion gas stream of a catalytic combuster or of an internal combustion engine equipped with a catalytic convertor, or the gas stream of a fuel cell catalytic reformer, where the gas stream passes over or through a heterogeneous catalyst in a manner that allows at least a portion of the gas stream to contact at least a portion of the catalyst. The radicals and oxidizing species are produced in either a remote generator, and then introduced into the gas stream, or, where the gas stream contains chemical species that can be converted into the desired radicals or oxidizing species under the proper conditions, the radicals and oxidizing species may be formed directly within the gas stream. The radicals may be introduced or produced at any point within the gas stream upstream of the downstream end of the catalyst, i.e., the portion of the catalyst farthest from the source of the gas stream.

The introduction of radicals into the gas stream results in at least one of the following:

1. An increase in the rate of the catalytic removal or conversion of certain chemical species in the gas stream, including the removal of pollutants from an exhaust stream by a catalytic convertor, or the conversion of a hydrocarbon fuel to hydrogen gas in a fuel cell catalytic reactor.
2. The removal of poisons from active sites on the catalyst surface, or the prevention of the adsorption of catalyst poison onto the catalyst surface, which improves and maintains the efficiency of the catalyst.
3. An increase in the rate and efficiency of oxidation reactions within the gas stream before contact with the catalyst.

In addition, maintaining the efficiency of the catalyst improves reliability, and obviates the need for catalytic overcapacity, thereby reducing volume and weight. Good results have been obtained by introducing the radicals and/or oxidizing species anywhere upstream of the downstream end of the catalyst.

The radicals and related gaseous oxidizing species enhance the oxidation of CO and HC to carbon dioxide ($CO_2$) and water ($H_2O$) in a catalytic convertor or combuster, and, in a fuel cell catalytic reformer, the conversion of fuel to carbon monoxide and gaseous hydrogen ($H_2$) in a first step, and then the conversion of the carbon monoxide formed in the first step to carbon dioxide. In addition, in internal combustion engines equipped with catalytic convertors, the introduction of radicals and/or active gaseous species also enhances the reduction of $NO_x$ to molecular nitrogen ($N_2$).

In particular, it has been observed that hydroxyl radical, OH, can react rapidly with CO to produce $CO_2$. It has also been observed that OH in the presence of oxygen can react rapidly with hydrocarbons (HC) to produce formaldehyde or other similar intermediary products, which then further react with OH to form $H_2O$ and $CO_2$, and regenerate OH. Therefore, it appears that these reactions do not necessarily consume OH, but, instead, regenerate OH, so that OH acts as a homogeneous catalyst.

In one embodiment, the present invention is directed to a method and an apparatus for the reduction of the amount of pollutants, such as carbon monoxide (CO), hydrocarbons (HC), and oxides of nitrogen ($NO_x$), in the exhaust gas stream produced by the high temperature combustion of fuel. The method and apparatus of the invention are useful with internal combustion engines equipped with at least one catalytic convertor in the exhaust system. Preferably the method and apparatus of the invention are used with an internal combustion engine further comprising at least one oxygen sensor upstream of the catalytic convertor. The oxygen sensor provides data to the fuel injection system of the engine that allows the fuel injection system to maintain a stoichiometric air/fuel ratio.

It has been discovered that the presence of OH, as well as that of other active or reactive species, such as other free radicals and gaseous molecular intermediates and oxidizers, including O, H, $NO_2$, $H_2O_2$, $HO_2$, and $O_3$, in the exhaust gases of a combustion engine in the presence of the requisite oxygen, provides a highly effective catalytic conversion of CO and hydrocarbons to non-polluting gas species, i.e., $CO_2$ and water vapor. The OH and other related free radical and gaseous molecular oxidizers created by reaction of OH with gaseous species in the exhaust stream act as catalysts independent of or in conjunction with the normal catalytic function of the catalytic converter.

Thus, the invention employs radicals, such as hydroxyl radical and active or reactive species, such as O, H, $NO_2$, $H_2O_2$, $HO_2$, and $O_3$, to provide a catalytic cycle for reducing CO and HC outputs of engines to meet present and future Ultra Low Emissions Vehicle "ULEV" and Low Emissions Vehicle "LEV" standards. Because the OH and other free radicals and active gaseous molecular oxidizing species act as catalysts, relatively small amounts of radicals need to be injected for orders of magnitude more CO and hydrocarbons to be reduced to $CO_2$ and $H_2O$ in the presence of oxygen in the exhaust gas stream.

The introduction of radicals and related gaseous oxidizing species into the combustion gas stream upstream of downstream end of the catalyst in a catalytic convertor results in the catalysis of the oxidation of CO and HC in the exhaust gas stream, and provides for the rapid removal of those pollutants. The catalytic conversion of CO to $CO_2$ and hydrocarbon to $CO_2$ and $H_2O$ by these oxidizing species occurs on the large surface in the catalytic converter, as well as in the gas phase in the exhaust stream. The enhanced conversion of CO and HC to $CO_2$ and $H_2O$ by radicals and other active species frees the bulk of the precious metal catalytic surface from participating in these competing reactions. The converter's precious metal sites no longer need to play as strong a role in catalyzing the less reactive hydrocarbon species, such as methane, ethane, ethene, benzene and formaldehyde, and, as a result, the catalytic activity at the precious metal sites can be directed toward reduction of nitrogen oxides to nitrogen and other non-polluting gas species.

Because the catalytic action of the radicals and related gaseous oxidizing species, such as hydroxyl radical, occurs throughout the volume of the exhaust gas, as well as on the surface of the catalytic converter, the present invention is significantly more effective than a catalytic converter operating in the conventional manner in reducing the emission of pollutants. The introduction of these radicals for oxidizing gaseous species upstream of the downstream end of the catalytic convertor also significantly reduces the emission of nitrogen oxides below the level obtained with conventional methods because the precious metal sites are freed from the conversion of CO and HC, and, thus, also allows a reduction in the amount of precious metals in the catalytic convertor or the use of less costly metals or their oxides, while maintaining the reductions in $NO_x$ that are obtained with prior art methods.

In addition, it has been discovered that the generation of radicals and related gaseous oxidizing species, and their introduction into the exhaust stream upstream of the downstream end of the catalyst in a catalytic convertor, cleans the catalytic convertor by reacting with and removing poisons on the active sites of the surfaces of the catalytic convertor, as well as preventing the adsorption or deposition of catalyst poisons onto the active sites of the catalyst. Catalyst poisons that the oxidizing action of these free radicals and related gaseous oxidizing species remove or prevent from being adsorbed include, but are not limited to, sulfur compounds, such as sulfates and sulfides of the noble metals in the catalyst, as well as SO and elemental sulfur, which may be bound to the surface forming a coating, phosphorous compounds, such as phosphides and phosphates of the noble metals, as well as $PO_2$, $P_2O_3$, and elemental phosphorous, which may also be bound to the surface of the catalyst forming a coating, and carbon compounds, such as carbon monoxide, which is adsorbed onto the surface, and can dissociate into atomic oxygen and carbon, resulting in carbonation.

The oxidation of catalytic poisons from the surfaces of the catalytic convertor removes the poisons from the catalytic surfaces so that the efficiency of the catalyst is improved, allowing the effective use of a catalyst bed having a smaller volume than that used in a typical catalytic convertor today. Therefore the introduction of free radicals and related gaseous oxidizing species has two independent effects that reduce the emission of pollutants. First, the catalytic action of the radicals and related gaseous oxidizing species directly removes pollutants from the exhaust gas stream. In addition, the removal of all or some of the poisons on the catalyst bed surfaces, in particular, the surfaces of the noble metals, improves the efficiency of the removal of pollutants, $NO_x$ in particular, by the catalytic convertor.

Referring to FIG. 1, a typical configuration for a modern automobile engine 11 having a catalytic converter 13 is illustrated. The catalytic converter 13 is positioned at the underbody of the automobile (not shown), and is situated in the exhaust gas stream 18 from the engine, in the exhaust pipe 12 downstream from the exhaust manifold 15, and before the muffler 17. Although this is the configuration commonly used today, it should be noted that a growing number of automobiles are being produced with closely coupled catalytic convertors that are positioned closer to the engine than shown in FIG. 1, such that the catalytic convertor is adjacent to or part of the exhaust manifold of the engine. In most automobiles produced today, an oxygen sensor 14 is positioned in the exhaust system upstream of the catalytic convertor 13. Data from the oxygen sensor 14 are used by the electronic controller of the fuel injection system to maintain a stoichiometric air/fuel ratio. Often, a second oxygen sensor 16 is located just downstream of the catalytic convertor to provide additional data for the fuel injection controller and the on board diagnostics of the vehicle.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel, where a catalytic converter can be used to reduce at least one pollutant from combustion, such as, for example, CO, HC, and/or $NO_x$, including, but not limited to, a three way catalyst typically used in today's modern automobile engines.

The catalytic converter 13 therefore comprises any device that catalytically removes or participants in the removal of at least one pollutant from an exhaust stream generated by burning a fuel, including, but not limited to, those with monolithic or granular ceramic substrates, metallic substrates, or substrates of any kind, and devices with noble metals or any other type of catalytic material. It would also include, without limitation, devices having semiconductor catalysts, such as oxides or sulfides of transition elements, and devices having ceramic-type catalysts, such as alumina, silica-alumina, and zeolites individually, in combination with each other and oxygen storage media such as cerium oxide or in combination with metal catalysts.

In one embodiment of the invention, oxidizing radicals and related gaseous oxidizing species are introduced into the exhaust stream upstream of the catalytic convertor, 13, and, preferably, upstream of the oxygen sensor 14, which is installed in most modern cars and light trucks. However, the oxidizing radicals and related gaseous oxidizing species may be introduced at any point in the exhaust stream that is upstream of the downstream end of the catalyst of the catalytic convertor, including the introduction or production of the radicals and related gaseous oxidizing species directly into the body of the catalytic convertor, 13, at a point upstream the downstream end of any portion of the catalytic convertor that contains catalytic material. Hydroxyl radicals, OH, and atomic hydrogen, H, may be produced from water vapor in the exhaust gas of the engine by a radical generator utilizing any means known in the art for producing radicals, such as UV light, but, preferably by an electrical corona discharge. Similarly, the radical generator may also produce atomic oxygen, O, from residual oxygen, $O_2$, in the exhaust gas. Typically, these radical species then react with other gaseous species in the exhaust stream to form other oxidizing species, such as $NO_2$, $H_2O_2$, $HO_2$, and $O_3$.

Figure 2:
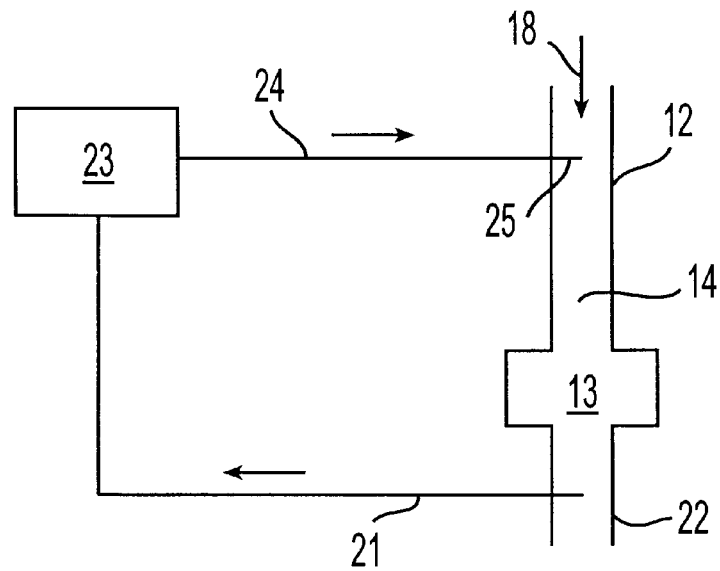
FIG. 2 is a schematic of an exhaust system incorporating a remote corona discharge generator of chemically active species.

The exhaust gas used to produce the free radicals may be taken from the downstream end of the catalytic convertor by diverting a portion of the downstream exhaust to a radical generator, and introducing the output of the radical generator into the exhaust upstream of the catalytic convertor, as shown schematically in FIG. 2. By operating the radical generator in exhaust gas taken from the downstream end of the catalytic convertor, the generator operates in a cleaner environment, substantially free from the pollutants removed by the action of the catalytic convertor and the oxidizing radicals and active gaseous species, which are produced by the discharge, and introduced upstream of downstream end of the catalytic convertor. This results in an improved discharge device lifetime, and substantially eliminates any fouling problems that may occur when the radical generator is positioned upstream of the catalytic convertor. However, when a corona discharge device is used upstream, the corona discharge itself should naturally reduce or eliminate its own potential contamination.

As shown in FIG. 2, a portion of the cleaned exhaust gas stream 21 that has passed through the catalytic convertor 13 is taken from the rear exhaust pipe 22, and diverted to the remote radical generator 23. The output 24 of the remote radical generator 23 is enriched with radicals as a result of the action of, e.g., UV light or a corona discharge on the exhaust gas 21, and is introduced into the exhaust gases in the tailpipe 12 upstream of the downstream end of the catalytic convertor 13. Preferably, an oxygen sensor 14, such as that found on most modern cars and light trucks, is positioned in the exhaust stream 18 upstream of the catalytic convertor 13, but downstream of the point 25 where the oxidizing species are introduced into the exhaust stream. However, because of the higher pressures in the exhaust system, pumping, such as with a Venturi (not shown), is required to accomplish direct injection of the output of a remote generator into the exhaust gas stream. Therefore, the direct, in situ production of free radicals by the action of a corona discharge on water vapor and residual oxygen in the exhaust stream is the most preferred method.

Figure 3:
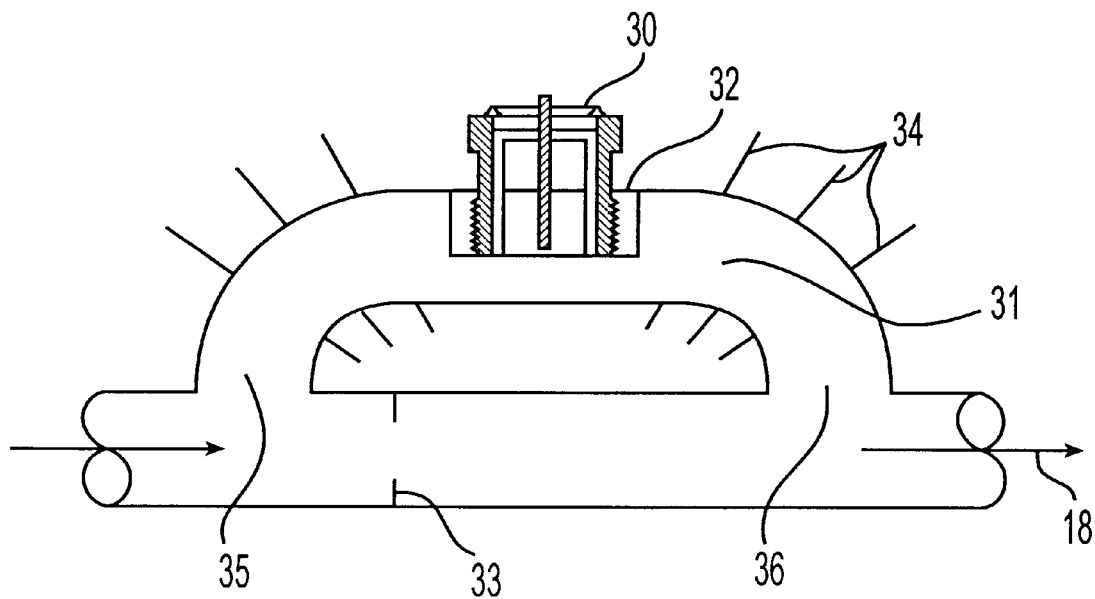
FIG. 3 illustrates a corona discharge device mounted in an exhaust shunt.

Preferably, the radicals and related gaseous oxidizing species are produced in the exhaust upstream of the downstream end of the catalytic convertor by a corona discharge device, placed in either the main exhaust pipe or in a shunt path in parallel with the main exhaust gas stream, as shown in FIG. 3. As shown in FIG. 3, a corona discharge device 30 is mounted in an exhaust shunt 31 in mount 32. The exhaust shunt 31 allows a portion of the exhaust gas stream 18 bypass a section of the exhaust pipe 12, by exiting the exhaust pipe 12 at a first point 35, typically upstream of the catalytic convertor 13, and re-entering the exhaust pipe at a second point 36, which is also upstream of the catalytic convertor 13. The exhaust shunt may require a restrictive orifice 33 or other device in the exhaust pipe to regulate or control the exhaust gas flow rate. Such a shunt path is useful in that it allows the corona discharge device to be operated in a lower temperature environment than that of the exhaust gas stream. Preferably, the heat loss of the shunt path is improved by providing an increased surface area with, e.g., cooling fins 34 or similar devices.

A lower temperature environment simplifies the design and choice of materials for the corona discharge device, particularly with regard to the electrical properties of the device during high temperature operation and its thermal design. This is particularly important, because the resistivity, loss tangent, and dielectric constant of the materials in the corona discharge device change with increasing temperatures. The change in these properties that occurs at high temperatures can seriously degrade the efficiency of the corona discharge device, decreasing the production of free radicals, and, thus, increasing the emission of pollutants. Where a corona discharge device is operated in a high temperature environment, the choice of materials is limited to those that experience a limited change in electrical properties with increasing temperatures. However, where the corona discharge device is operated in a lower temperature environment, such as that of a shunt path, other, less expensive materials that possess the desired electrical properties at lower temperatures, but lack the desired properties at high temperature may be used.

Operation at lower temperatures also reduces or eliminates problems related to a mismatch in the thermal coefficient of expansion of materials in the corona discharge device, its support, and the exhaust pipe. This reduces or eliminates strain induced material and seal failures, as well as failures caused by the numerous thermal cycles the corona discharge device will experience during the lifetime of the engine.

Figure 13:
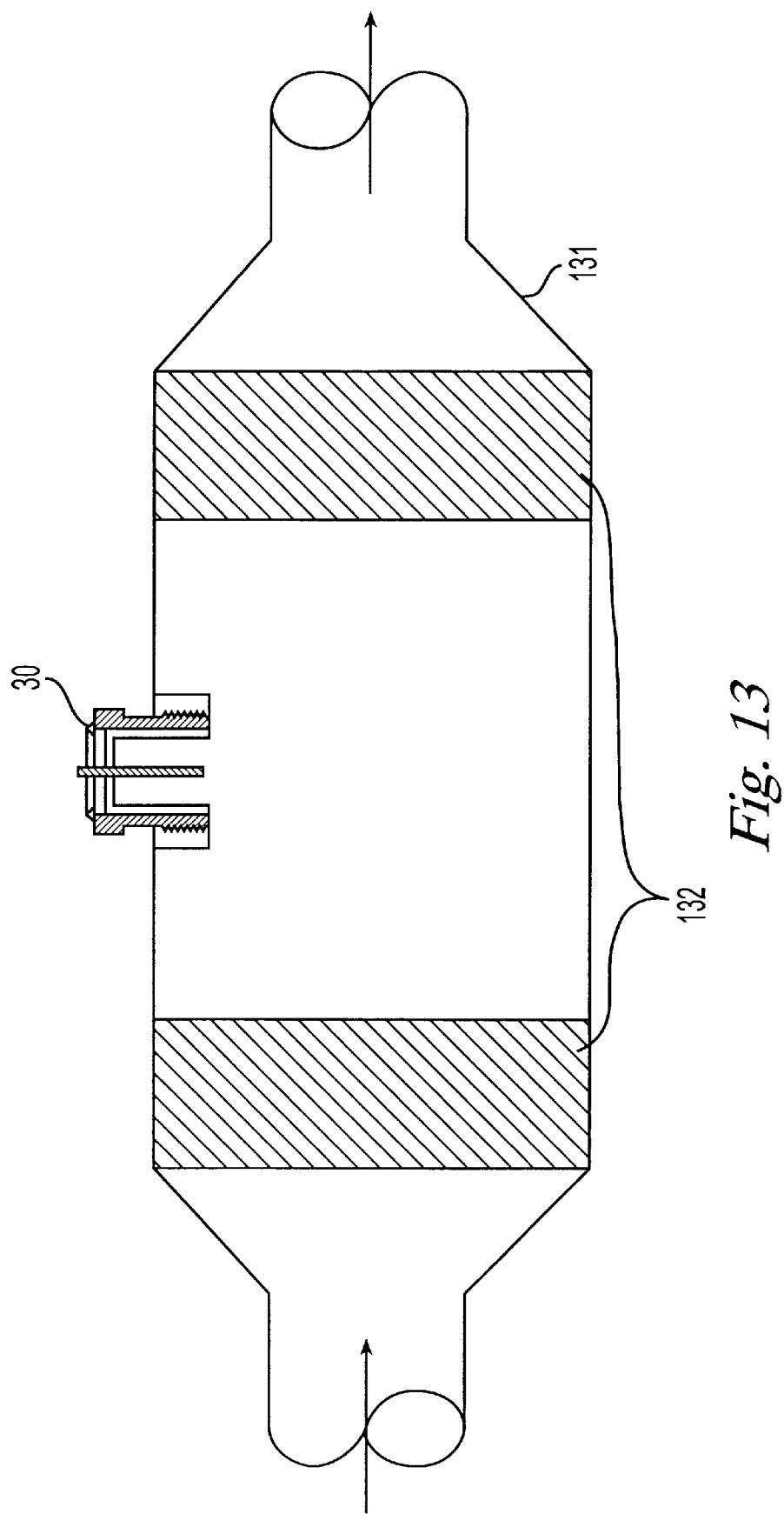
FIG. 13 illustrates the use of a corona discharge device with a catalytic convertor.

The free radicals or other active species may also be produced by a corona discharge device 30 mounted within the catalytic convertor 13. As shown in FIG. 13, a typical three way catalytic convertor comprises an outer steel shell or container, 131, and a plurality, in this case two honeycomb catalyst "bricks", 132. The corona discharge device 30, as shown in FIG. 13, may be mounted between the two honeycomb catalyst "bricks", 132, or at any other position that introduces the radicals at a point upstream of the downstream end of at least one of the two catalyst bricks, 132. In addition, the radicals may be produced in a remote radical generator, such as that shown in FIG. 2, and then introduced into any point in the catalytic convertor upstream of the downstream end of the catalyst in the catalytic convertor. As can be seen in FIGS. 3, 10, 11, and 13, the corona discharge device typically has a principal axis that is positioned at an angle to the direction of the gas flow, and is preferably positioned perpendicular to the gas flow.

The free radicals and other active species may also be produced in the pre-combustion gas stream by a corona discharge upstream of the point that the air enters the engine. A drawback of the production or injection of the oxidizing species in the intake manifold is that a significant fraction of the highly chemically active species may be destroyed in the combustion process, and only those active species that reside in the crevice regions and at the walls of the combustion chamber can effectively survive, and enter into the exhaust gas stream. In contrast, generators that inject free radical and gaseous molecular oxidizers directly into or which create these species in the exhaust (postcombustion) gas stream can more effectively deliver the active species into the exhaust stream where CO and HC need to be oxidized. Thus, the relative amount of radicals that must be produced to provide a given amount of radicals at the catalytic convertor is significantly smaller when the active species are produced in or introduced into the exhaust gas stream than the amount required for other methods. This directly translates into proportionally lower electrical input demands for the radical generator.

Figure 14:
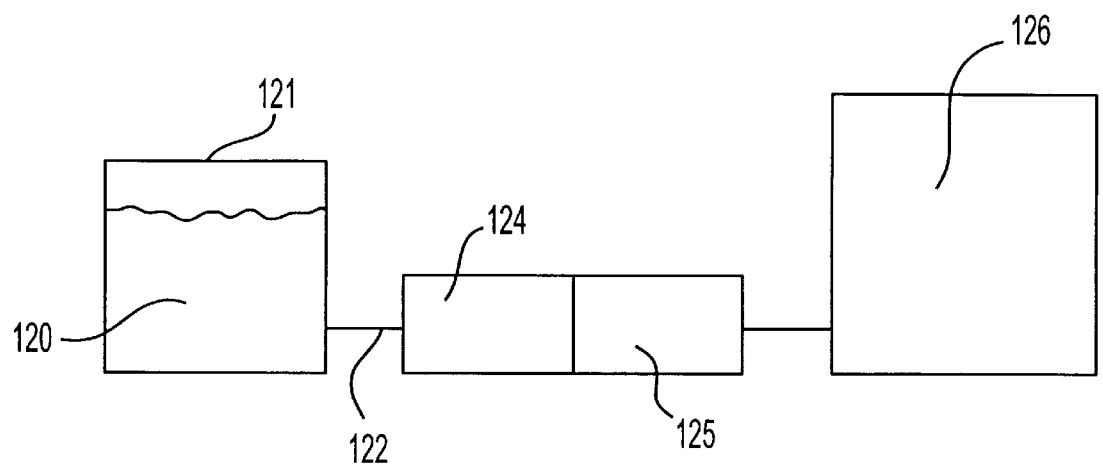
FIG. 14 is a schematic of a fuel cell catalytic fuel reformer.

In a further embodiment, the present invention is directed to a method and an apparatus for producing gaseous hydrogen from a liquid or gaseous hydrocarbon as fuel for use in a fuel cell. A typical fuel cell catalytic reformer, 140, for converting hydrocarbon fuel to $H_2$ for use in a fuel cell is shown schematically in FIG. 14. A liquid or gaseous hydrocarbon fuel, 120, such as gasoline, methane, methanol, or ethanol, is stored in a fuel tank, 121. Fuel, 120, from tank, 121, is vaporized, if necessary, forming a gas stream, and is introduced into a partial oxidation reactor, 123, typically, through a connection pipe, 122, where the fuel is partially burned with a small amount of air to produce $H_2$ and CO. The partial oxidation of the fuel in the partial oxidation reactor, 123, may be performed in the presence of a catalyst.

The resulting gas stream, comprising a mixture of nitrogen, $N_2$, CO, and $H_2$, is then passed into a catalytic reactor, 124, where steam is added in the presence of a catalyst to remove CO and produce additional $H_2$ by the reaction

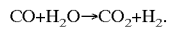
$$CO+H_2O \rightarrow CO_2+H_2.$$

The remaining CO is preferentially oxidized in the presence of a preferential oxidation catalyst, 125, resulting in a mixture of $H_2$, $CO_2$, $H_2O$, and $N_2$, which is sent to the fuel cell, 126, where the $H_2$ is combined with $O_2$ to form water and electricity. As $NO_x$ is not present in any of the gas streams of the catalytic reformer, only an oxidation catalyst is require, and, thus, reduction catalysts, such as rhodium, need not be used.

As with automotive catalytic convertors, it has been discovered that the presence of OH, as well as that of other free radical and gaseous molecular intermediates and active species, such as O, H, $NO_2$, $H_2O_2$, $HO_2$, and $O_3$, in the gas stream of the reformer, provides a highly effective catalytic conversion of CO, as well as eliminating or substantially reducing the amount of catalyst poisons in the gas stream or on the surface of the catalysts in the reformer. The benefits of the invention may be obtained by introducing radicals into any gas stream in the reformer at any point upstream of the downstream end of any of the catalysts used in the fuel cell catalytic reformer or reformers.

Introduction of radicals into the catalytic reactor stage, 124, serves two functions. First, hydroxyl radicals can react with CO to form carbon dioxide and additional hydrogen gas by the reaction

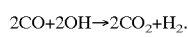
$$2CO+2OH \rightarrow 2CO_2+H_2.$$

In addition, the presence of radicals and other oxidizing species will remove adsorbed catalyst poisons, and prevent the adsorption of catalyst poisons onto the surface of the catalyst, providing for better CO to $CO_2$ conversion. The addition of radicals to the preferential oxidation catalyst will convert CO to $CO_2$ and $H_2$, and remove and prevent the adsorption of poisons in the same manner.

However, because of the high reactivity of the oxidizing radicals and other active gaseous species with hydrocarbon fuels, the radicals may be introduced into the partial oxidation reactor only when the hydrocarbon fuel is not present. Should the highly reactive radicals be introduced into the partial oxidation reactor when fuel is present it is likely that most of the radicals would be consumed by reaction with the fuel, and, thus, the radicals would have little effect on catalyst poisons in this stage of the catalytic reformer. Therefore, the radicals are preferably introduced into the partial oxidation reactor only during a "cleanup" or "recovery" cycle in which any catalyst poisons adsorbed onto a catalyst in the catalytic reformer, in particular, any catalyst used in the partial oxidation reactor, may be oxidized and removed to clean and recover the catalyst. If a "cleanup" or "recovery" cycle or mode is required, it may be desirable to provide a pair of catalytic reformers in parallel for a fuel cell that will be used on a substantially continuous basis. In this manner, one catalytic reformer may be used to provide hydrogen fuel for the fuel cell, while the second reformer is in the recovery mode. By cycling between reformers in this manner, each reformer could always be operated with a minimum of catalyst poison adsorbed onto the catalyst.

However, it has also been discovered that the generation of radicals and related active gaseous species, and their introduction into a gas stream in the catalytic reformer upstream of the downstream end of a catalyst in either the catalytic reactor or the preferential oxidation catalyst during operation of the catalytic reformer, cleans the catalyst in those stages by reacting with and removing poisons on the active sites of the surfaces of the catalytic convertor, as well as preventing the adsorption or deposition of catalyst poisons onto the active sites of the catalyst.

As with automotive applications of the invention, hydroxyl radicals, OH, and atomic hydrogen, H, are produced from water vapor in a gas stream of the catalytic reformer. The radicals may be formed by a radical generator utilizing any means known in the art for producing radicals, such as UV light, but, preferably by an electrical corona discharge. Similarly, the radical generator may also produce atomic oxygen, O, from residual oxygen, $O_2$, in the exhaust gas. Typically, these radical species then react with other gaseous species in the exhaust stream to form other oxidizing species, such as $NO_2$, $H_2O_2$, $HO_2$, and $O_3$. Where the radicals are produced during the operation of the catalytic reformer, it is preferred that the radicals be produced in at least one of the catalytic reactor, the preferential oxidation reactor, or within a gas stream supplying air or water vapor to at least one of the catalytic reactor or the preferential oxidation reactor. As with the automotive applications, it is preferred that the radicals be produced with a corona discharge device of the type described below.

A corona discharge device for use with the invention should preferably be capable of functioning for at least about 3,000 to about 4,000 hours in the high temperature environment of the exhaust stream of an internal combustion engine before replacement is required. Because of space limitations in modern automobiles and in applications using fuel cells, it is preferred that the corona discharge device have a small physical volume, i.e., on the order of the size of a typical spark plug, and require a power supply that is no larger than about 300 to about 400 cubic cm. In certain embodiments, in addition to operating at a temperature on the order of about 800° C., the corona discharge device must meet automotive electromagnetic interference (EMI) requirements, be readily replaceable, and be capable of withstanding thousands of thermal transients of about 800° C., such as those experienced during start-up and cool down of an engine, as well as several million smaller thermal transients where the change in temperature may be on the order of about 200° C. In a preferred corona discharge device, about 20 to about 50 W of high frequency, high voltage power is required, i.e., from about 1,000 to about 250,000 Hz and from about 5,000 to about 20,000 VAC. However, under some transient operating conditions, such as engine cold or warm starts, more radical production may be desired. In this case the corona device would require operation at higher power levels of up to 200 to 300 watts. This transient power condition can be met by increasing the frequency voltage product to the corona device by a factor of 5 to 10 for such periods, which typically range from about 30 to about 100 sec. This can be accomplished through proper corona unit high voltage power system design, and the use of control signals from the engine controller or local startup temperature readings.

Figure 15A:
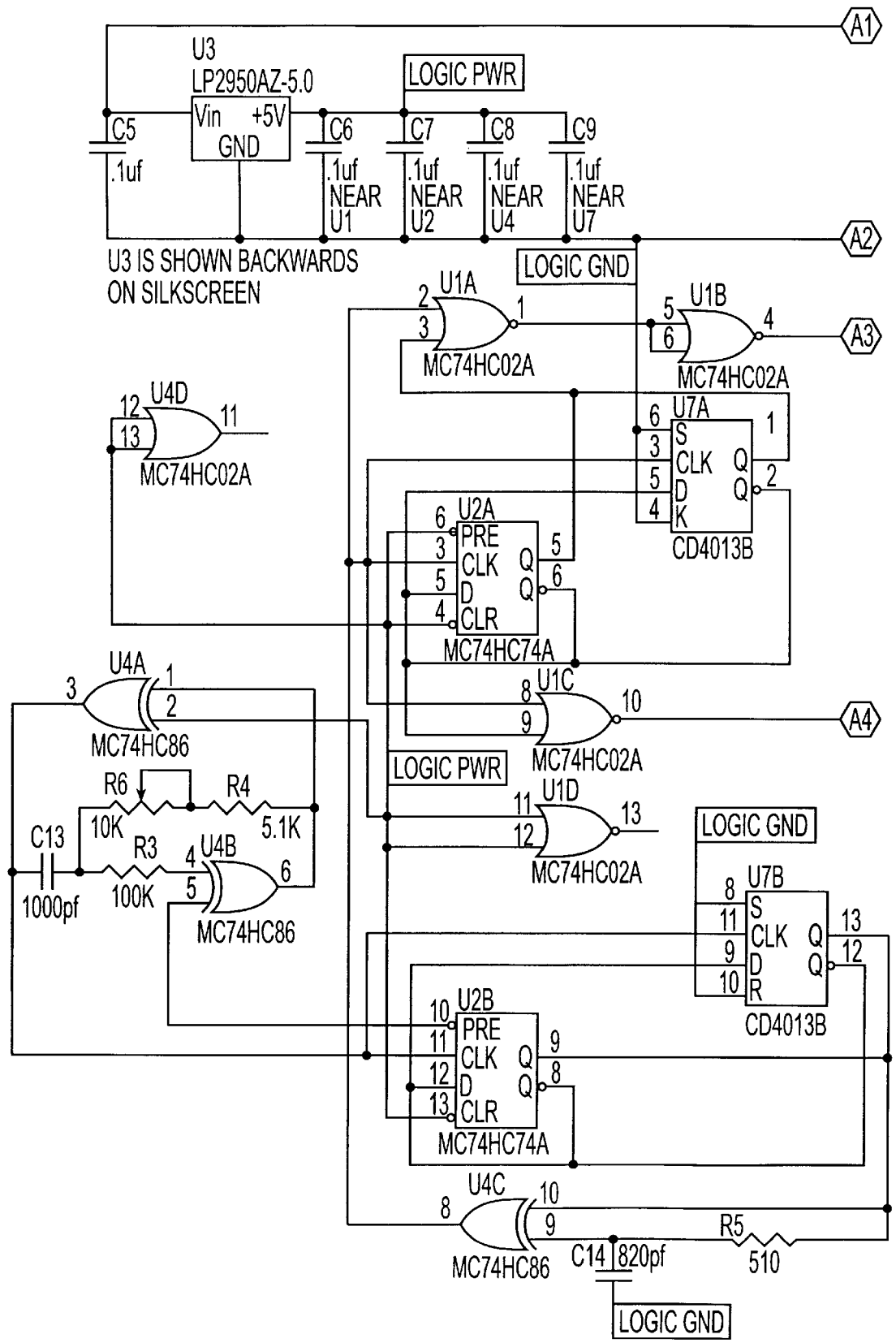
FIG. 15 is a schematic of an example of a power supply circuit for use with a corona discharge device.
Figure 15B:
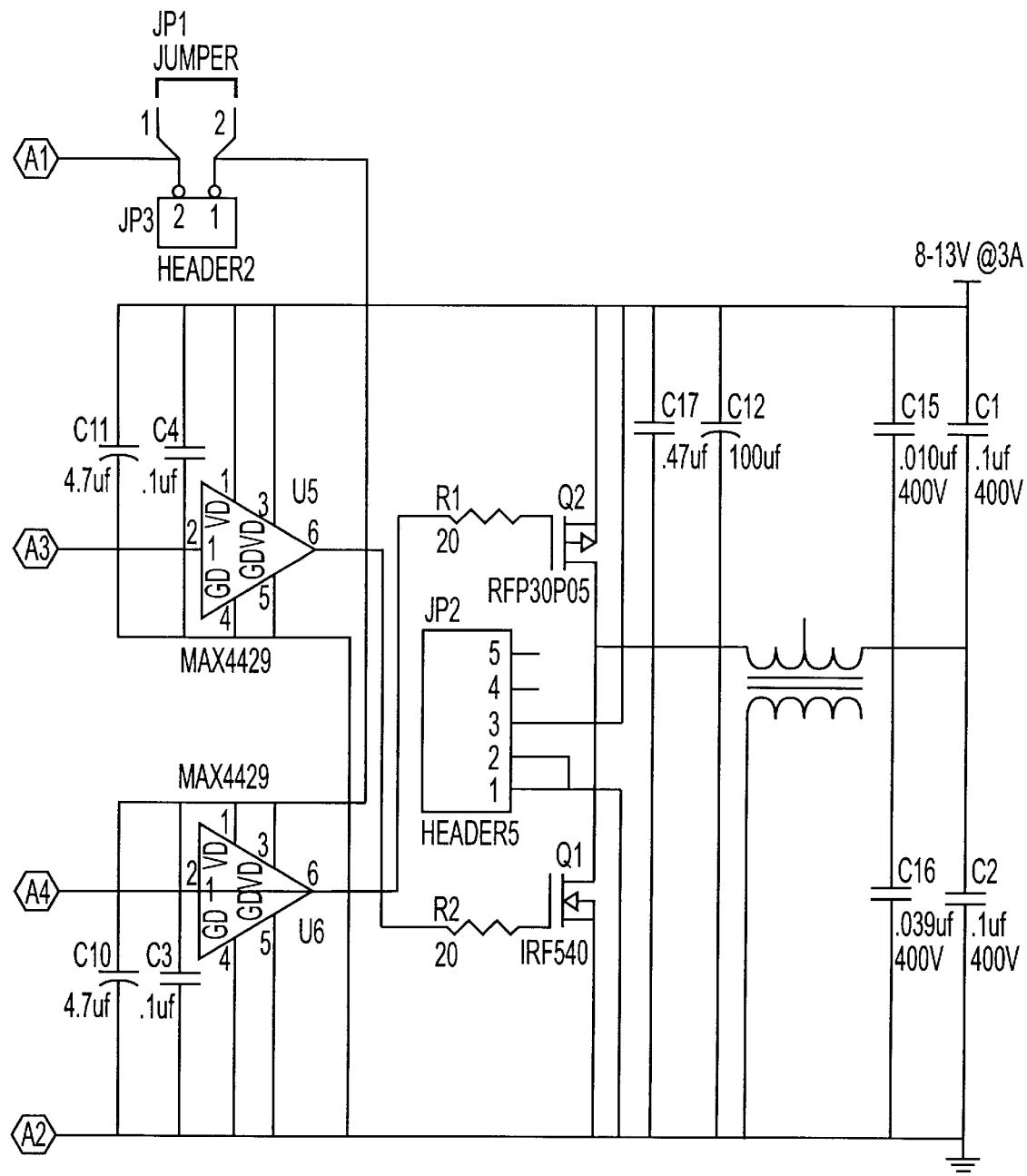

An example of the circuitry for a power supply useful with the present invention is shown in FIG. 15. The circuitry shown in FIG. 15 provides a resonant switch-mode invertor capable of converting a 12 VDC nominal input voltage to an approximately 10 kVAC sine wave output to drive a capacitive "silent discharge" device, such as the corona discharge device of the invention.

Figure 4:
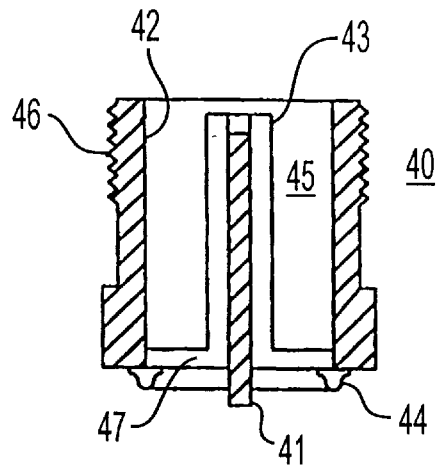
FIG. 4 illustrates a corona discharge device having concentric electrodes and a dielectric coated inner electrode.
Figure 5:
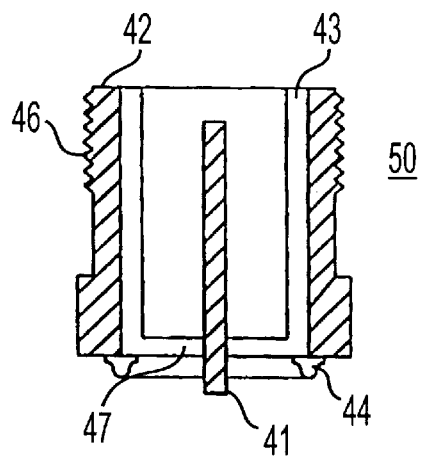
FIG. 5 illustrates a corona discharge device having concentric electrodes and a dielectric coated outer electrode.
Figure 6:
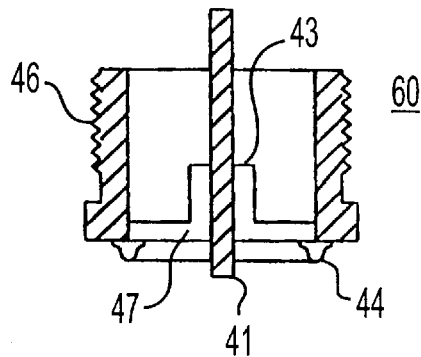
FIG. 6 illustrates a distant ground corona discharge device.

Corona discharge devices useful in the invention include, but are not limited to, those having generally cylindrical symmetry and, in most cases, at least two concentric electrodes. At least three general design alternatives for corona discharge devices that have generally cylindrical symmetry exist. These three general design alternatives are illustrated in FIGS. 4, 5, and 6. FIG. 4 is a cross-section of a cylindrical corona discharge device 40 having concentric cylindrical electrodes inner electrode 41 and outer electrode 42. The device 40 typically includes a ferrule 44 in the base 47, which provides a gas seal, and threads 46 or other means for mounting the device 40 in the exhaust pipe 12 or shunt 31. The inner electrode 41 is surrounded by a dielectric layer 43, which prevents breakdown, and maintains the corona discharge. It is important for the overall efficiency of the device to have the predominant voltage across the "air" gap 45 of the device. Because the dielectric layer 43 in the corona discharge device shown in FIG. 4 is located in a region where high electric fields occur, most of the voltage is across the "air" gap of the corona discharge device, and the efficiency of the device is maintained.

However, depending on the design of the corona discharge device, the dielectric, due to its conductivity, may act as a shunt conductive path to ground that effectively reduces the current to the corona discharge. Where the corona discharge device is subject to shunt capacitive losses in the region of the base 47 that increase proportionally with increasing dielectric constant, a decision is often required during the design of a corona discharge device of this type, as to the relative importance of the voltage drop across the dielectric and the shunt capacitive losses in the base region. In practice, the careful design of the corona discharge device will minimize the effective area of the shunt capacitance, and provide a low dielectric constant.

Resistive losses also occur in dielectrics at high temperatures, and, thus, a dielectric material must be selected in which the resistive losses are acceptably low, or the corona discharge device must be operated in a chamber or shunt path off of the exhaust system to allow operation at a lower temperature. Other design issues include EMI, resistance to corrosion in the corrosive, high temperature environment, contamination, condensation of water during engine cool down, and vibration. For EMI, the corona discharge device and its power supply and leads must have sufficient shielding to meet automotive system EMI requirements.

Material selection should be based on high temperature behavior and the ability to withstand a corrosive environment that could limit the design life or performance of the device, e.g., high temperature diffusion of contaminants into the dielectric that could lower the resistivity of the dielectric below the required value for maximum efficiency, and possibly result in the formation of a partial or complete short circuit in the device. However, the corona discharge itself should naturally reduce or eliminate contamination of the device.

The need for a high dielectric constant can be reduced or eliminated by placing the dielectric layer 43 on the inner surface of the outer electrode 42. Such a device 50 is illustrated in FIG. 5. Because the electric fields that occur in the region of the outer electrode 42 are relatively low compared to those in the region of the center electrode 41, a dielectric material having a lower dielectric constant may be used for the dielectric layer. This reduces shunt capacitive losses, while maintaining a limited voltage drop across the dielectric layer.

It is also possible to use, for example, the exhaust pipe 12 or exhaust shunt 31 as a distant ground for the corona discharge device, eliminating the need for an outer electrode. Such a distant ground corona discharge device 60 is shown in FIG. 6, and only requires an inner electrode 41, preferably, with a sharp or small radius tip to promote breakdown, a dielectric insulator 43, and a base 47, which typically includes a ferrule 44 to provide the required seal and strain relief. Because a distant ground device is only subject to base loss considerations, such a device also allows the use of dielectric materials having a low dielectric constant.

Figure 7:
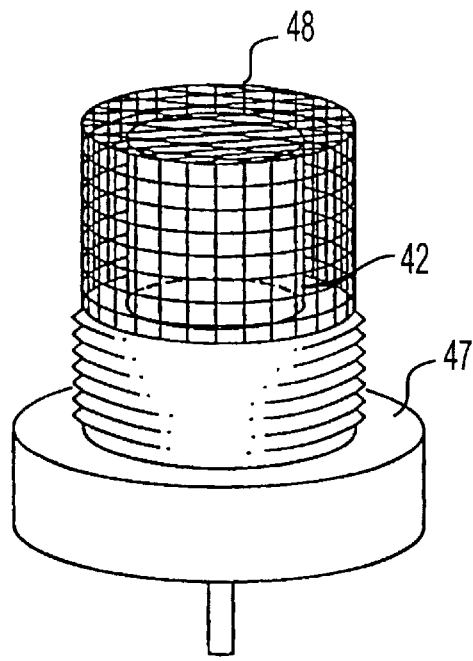
FIG. 7 illustrates a corona discharge device of the type depicted in FIG. 5 equipped with a flame arrester.

It may also be desirable in some applications to include one or more flame arresters in the design of the corona discharge device. Such a device is shown in FIG. 7, in which a corona discharge device 50 having an outer electrode 42 coated with a dielectric layer 43 is capped with a flame arrester 48 in the form of a wire screen. Such a flame arrester will prevent the ignition of exhaust gases containing fuel and oxygen during engine starts and misfires.

However, in some internal or external combustion engine applications, the ignition of exhaust gases to initiate partial or complete combustion of residual fuel in the exhaust gases is desirable, thereby reducing harmful emissions, such as, e.g., during the cold start phase of the engine operation or under conditions where the engine misfires. Such corona assisted combustion of residual fuel and hydrocarbons is possible without the production of additional $NO_x$ due to the low temperature of the combustion process in the exhaust stream.

Under conditions where the engine misfires, the fuel air mixture will be substantially stoichiometric, and no additional air is required to initiate combustion of the resulting exhaust gas. However, to initiate combustion of the residual fuel in the exhaust during cold start conditions, additional air must be added to the exhaust gas stream upstream of the corona discharge device, as the exhaust gases are fuel rich under those conditions. The oxygen required for combustion can be provided through controlled injection of air, either by self pumping, such as through the pumping action of a Venturi section in the exhaust pipe, or by an upstream air pump. With a Venturi, a fast acting valve, such as an electro-mechanical valve or a valve based on MEMS (Micro Mechanical-Electronic Systems) technology would be required to terminate the air injection after the cold start period was complete. The rate of air injection is limited with a Venturi, and, thus, only partial combustion of residual fuel is possible with Venturi pumping. However, an air pump is not subject to such a limitation, and can provide sufficient air for complete combustion of any residual fuel in the exhaust gas stream.

Where the ignition of exhaust gases by the corona discharge is desired, it may also be desirable to use flame arresters, such as wire screen to control or limit the regions of the exhaust stream in which corona assisted combustion could occur to any of, e.g., upstream of the corona discharge device, downstream of the device, both upstream and downstream of the device, or in a limited volume in and around the corona discharge device.

Corona discharge devices useful in the present invention may be of any type that produces a corona sufficient to form an effective amount of active chemical species, such as hydroxyl radical. For example, representative corona discharge devices, such as those shown in FIG. 4 and FIG. 5, may be modified sparkplug-like devices, having a small center electrode 41 with a diameter of about 0.1 to about 0.3 cm. The inner electrode 41, is inserted into and held in place by a hole in the dielectric layer 43 in the base 47. In devices where the dielectric layer 43 is positioned on the inner surface of the outer electrode 42, the dielectric layer 43 basically forms a cup having a hole in its base to position the inner electrode. The outer electrode has an inner diameter of about 1 to about 2 cm and a length of about 1.5 to 3 cm. The dielectric layer has a base and wall thickness of about 1 to about 3 mm, which is chosen to provide the desired dielectric strength at the operating voltage of the corona discharge device.

The dielectric layer adjacent to the interior wall of the outer electrode and the "air gap" between the dielectric layer and the inner electrode are essentially two series capacitances. Because they are in series, the currents through the air gap and the dielectric in this region are equal, and, thus, the instantaneous corona power dissipation for cylindrical electrodes may be expressed as $$P_i = V_i I_d = \omega C_d \cdot V_s \cos(\omega t).$$

The average power dissipation is then expressed as $$P = \langle Pi \rangle = 4 C_d \cdot V_s f \left[ V_o - \left( \frac{C_d + C_g}{C_d} \right) V_s \right]$$

where $C_d$ is the solid dielectric capacitance, $C_g$ is the air gap capacitance, $V_s$ is the spark breakdown potential, $V_o$ is the applied voltage, and $f = \omega/2\pi$.

This means that, using "spark plug" technology, a very compact, replaceable corona discharge unit can be produced, having the required power level.

The outer surface of the outer electrode can be used to mount the corona discharge device in the exhaust pipe or manifold, an exhaust shunt path, in an anterior chamber to the exhaust pipe, a mounting plate on or in one of these devices, or any other simple means of mounting the corona discharge device that provides a good exhaust gas seal. This simple mounting scheme allows easy removal and installation of the corona discharge device in the exhaust system, and with a shunt path or slight recess in the exhaust system represents little or no interference to the main exhaust flow. In each case, the corona discharge device is placed in the exhaust gas of the engine, so that the desired free radicals are produced directly from water vapor, residual oxygen, and other constituents of the exhaust gas.

The condensation of water during cool down could result in a short out of the corona discharge device, and, thus, the device is preferably mounted in the top of the exhaust pipe, so that the electrodes face down, minimizing the exposure to water during those times when the temperature is too low to drive off any water. In addition, vibration problems may be avoided by designing the device and its power supply and wiring to have natural resonant frequencies well above automobile vibrational frequencies.

As discussed above, the resistive and capacitive shunt losses of the dielectric layer used to provide an insulating support between the two electrodes of a corona discharge device are a major consideration in the design of such a device. Any reduction in shunt capacitance allows operation of the discharge at higher frequencies at a given capacitive power loss, and, according to basic design principles for a corona device having a power output proportional to the frequency of the applied voltage, would allow a more compact design. A more compact design is advantageous in that it allows the use of a smaller corona gap, which, in turn, results in a lower breakdown voltage across the gap, and, thus, allows the use of a lower operating voltage. The lower operating voltage results in lower resistive and capacitive losses, increasing the efficiency of the corona discharge device. The smaller, more efficient corona discharge device will thus require a smaller power supply, which is a major advantage in modern vehicles where space is at a premium.

Figure 8:
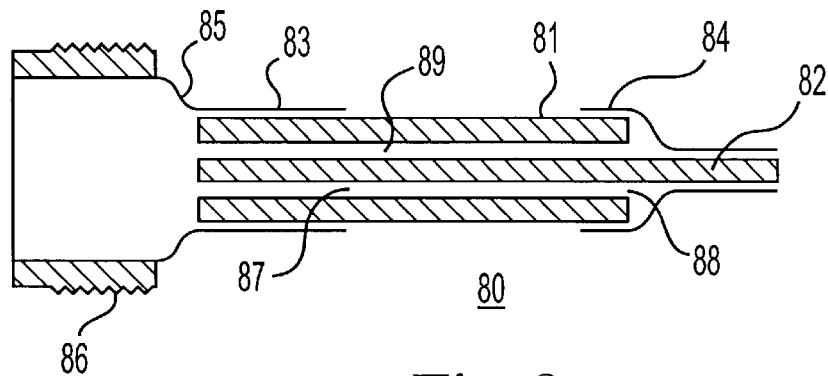
FIG. 8 illustrates a compact corona discharge device.

A representative design for such a compact corona discharge device is shown in FIG. 8. FIG. 8 illustrates the physical components of an efficient compact corona discharge device 80, as well as the important device operating and device design regions. The illustration, as well as the dimensions given below, is merely representative of a generic design, and one of ordinary skill in the art will recognize that many variants that fall within the scope of the general design principles illustrated and discussed here.

The key features of the embodiment illustrated in FIG. 8 include a long, thin-walled dielectric insulator 81 that, along with the proper selection of materials, provides a path of high resistance between the inner 82 and outer 83 electrodes that are supported by the insulator 81. A thin metal cap 84 is provided as a gas seal. The inner electrode 82 may be substantially longer than the outer electrode 83. In one such embodiment, the inner electrode 82 typically has a length that is at least about twice that of the outer electrode 83, and, preferably, at least about 4 times the length of the outer electrode 83, and the length of the inner electrode 82 is typically about at least about 4 times, preferably at least about 6 times, the diameter of the corona discharge device 80, as determined from the diameter of the dielectric insulator 81. The outer electrode 83 is mechanically and electrically connected to the base 85 of the compact corona discharge device 80, where the base includes threads 86 or other similar mounting means to mount the device 80, such that exhaust gases may enter into the air gap 89. As a result of the difference in the length of the inner and outer electrodes 82 and 83, the air gap 89 is divided into a corona discharge region 87, i.e., that part of the air gap 89 where the inner and outer electrodes overlap, and a ullage volume 88, i.e., that portion of the air gap 89 that extends from the outer electrode 83 to the metal cap 84.

A typical compact discharge device 80 may have an outer electrode 83 with a length of about 1 to about 2 cm, preferably about 1.5 cm, and an inner electrode 82 with a length of about 4 to about 8 cm, preferably about 5 to about 7 cm, most preferably about 6 cm. The dielectric insulator 81 of such a device can be constructed from a ceramic material such as Fosterite, and will have a diameter of about 0.7 to about 1.3 cm, preferably about 1 cm, a length of about 3 to about 5 cm, preferably about 4 cm, and a thickness of about 0.1 to about 0.2 cm, preferably about 0.15 cm, can be used at a temperature of up to about 900° C. with resistive power losses of less than about 10% at a maximum operating voltage of at least about 5,000 V. In a relatively low temperature environment, such as that in an exhaust shunt, and because of the temperature variation along the ceramic dielectric insulator 81, an even higher operating voltage is possible, while maintaining an acceptable power loss. A corona discharge device of this design would provide about 30 to about 50 W of power operating at a frequency of about 100 kHz. However, under some transient operating conditions, such as engine cold or warm starts, more radical production may be desired. In this case, the corona device would require operation at higher power levels of up to 200 to 300 watts. This transient power condition can be met by increasing the frequency voltage product to the corona device by a factor of 5 to 10 for such periods, which typically range from about 30 to 100 sec. This can be accomplished through proper corona unit high voltage power system design and the use of control signals from the engine controller or local startup temperature readings. The long insulating path and thin walls of the insulator 81, minimize the capacitive shunt losses to less than about 10%, even for insulators having a dielectric constant of more than 10 at operating frequencies on the order of about 100 kHz. Such a high operating frequency allows the use of a very compact high voltage power supply.

As discussed above, the expression for the power dissipation in a corona is given by $$P = 4 C_d \cdot V_s \cdot f \{ V_o - ((C_d + C_g)/C_d) \cdot V_s \},$$

where $C_d$ and $C_g$ are respectively the capacitance of the dielectric and the gap in the corona region, $V_s$ and $V_o$ are respectively the spark breakdown voltage of the gap and the applied voltage to the corona device, and f is the frequency of the voltage applied to the device. Taking values of these quantities of as $V_o = 5,000$ V, $V_s = 3,000$ V, $C_d = 6 \times 10^{-12}$ farad, $C_g = 1 \times 10^{-12}$ farad; then at a frequency of $3 \times 10^5$ Hz, the power in the corona is about 27 W. The output can be scaled by frequency, applied voltage, or capacitance (primarily the length of the corona discharge region). The output can be controlled by the frequency and/or voltage of the corona device power source.

The spark breakdown voltage is almost directly proportional to the density of the exhaust gas in the corona gap region, which is almost directly proportional to the temperature in the gap region. This breakdown voltage will vary in proportion to the temperature of the gas in the corona unit, and, therefore, its operating temperature. If, for example, the design were such that the gas temperature in the corona unit were half of the exhaust temperature, then the lower breakdown voltage would increase to 6,000 v.

Figure 9:
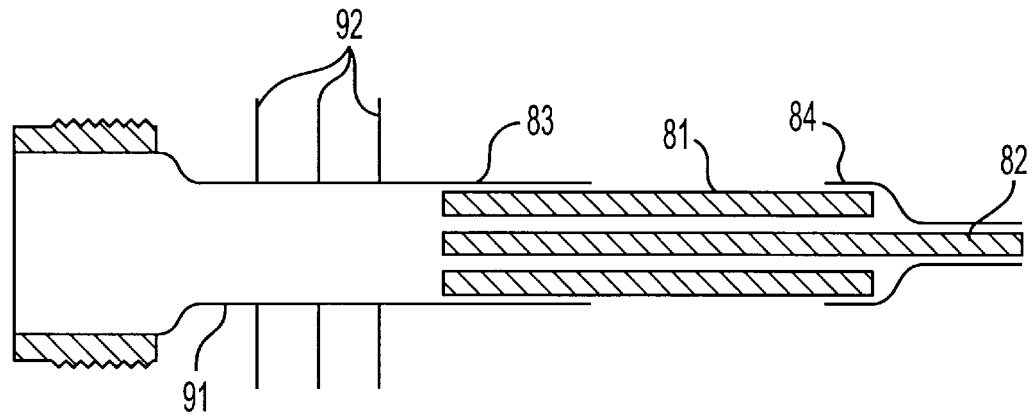
FIG. 9 illustrates a compact corona discharge device having an extended skirt.
Figure 10:
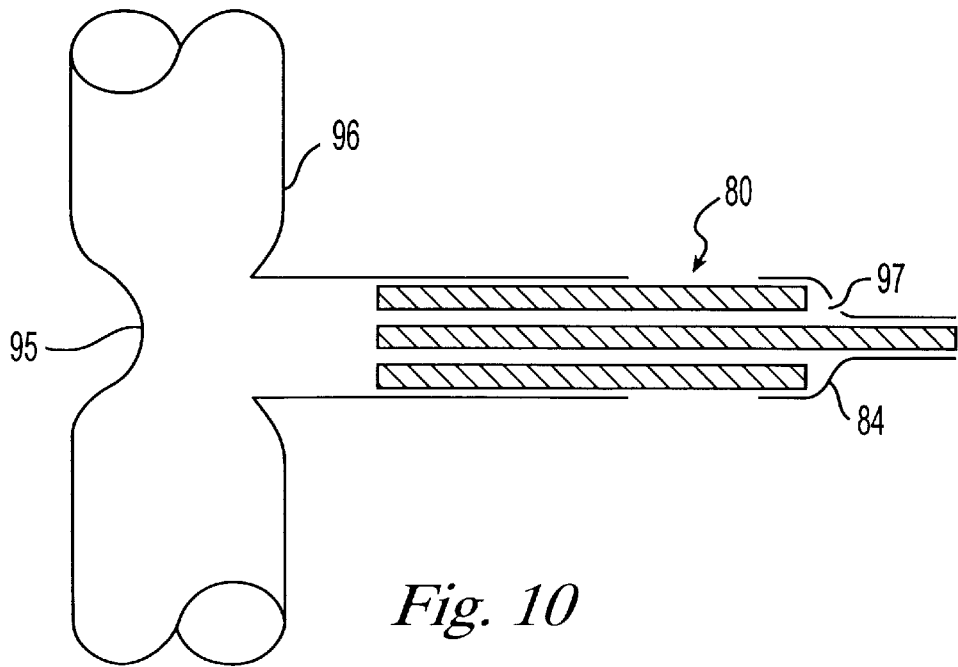
FIG. 10 illustrates a compact corona discharge device equipped with an orifice for injecting air.
Figure 11:
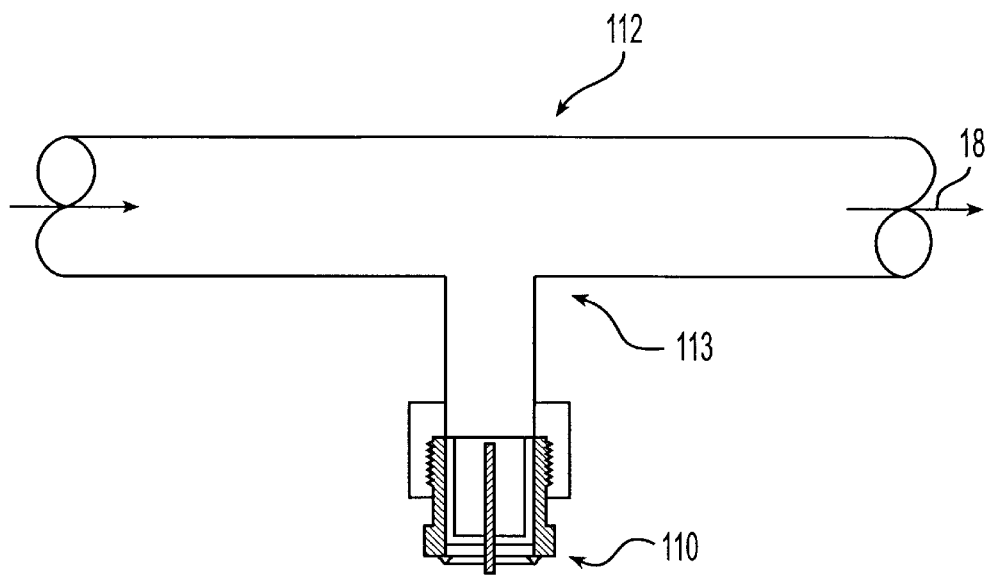
FIG. 11 illustrates a corona discharge device mounted in a manner that takes advantage of the pumping action of pressure variations in the exhaust gas stream.

FIGS. 9 and 10 show two design variants on the above design. In FIG. 9 the skirt section 91 is lengthened and extended surfaces 92 are employed to augment heat exchange to the ambient environment. The longer conduction path along with the heat exchangers provide for cooler operation of the dielectric material 81 in particular, thus providing for a wider selection of materials or better performance for this application with satisfactory resistance and capacitance at the resulting operating temperature. It has also been observed in tests that the injection of small amounts of air (<10 cc/sec) in a manner that modifies the engine stoichiometry to permit the operation of the catalyst at a desired equivalence ration, e.g., by injecting air upstream of the engine side oxygen sensor, results in no adverse engine performance or engine/catalyst emission performance. In FIG. 10 a pumping action is provided by the low pressure produced in a Venturi section 95 added to the exhaust system 96. This low pressure in conjunction with the orifice 97 in the metal cap 84 of the compact corona discharge device 80 provides for an air flow of less than about 10 cc/sec, which limits the temperature, cooling the ceramic dielectric section of the corona device, and aids in the injection of radicals generated in the corona discharge.

Figures 12A, 12B:
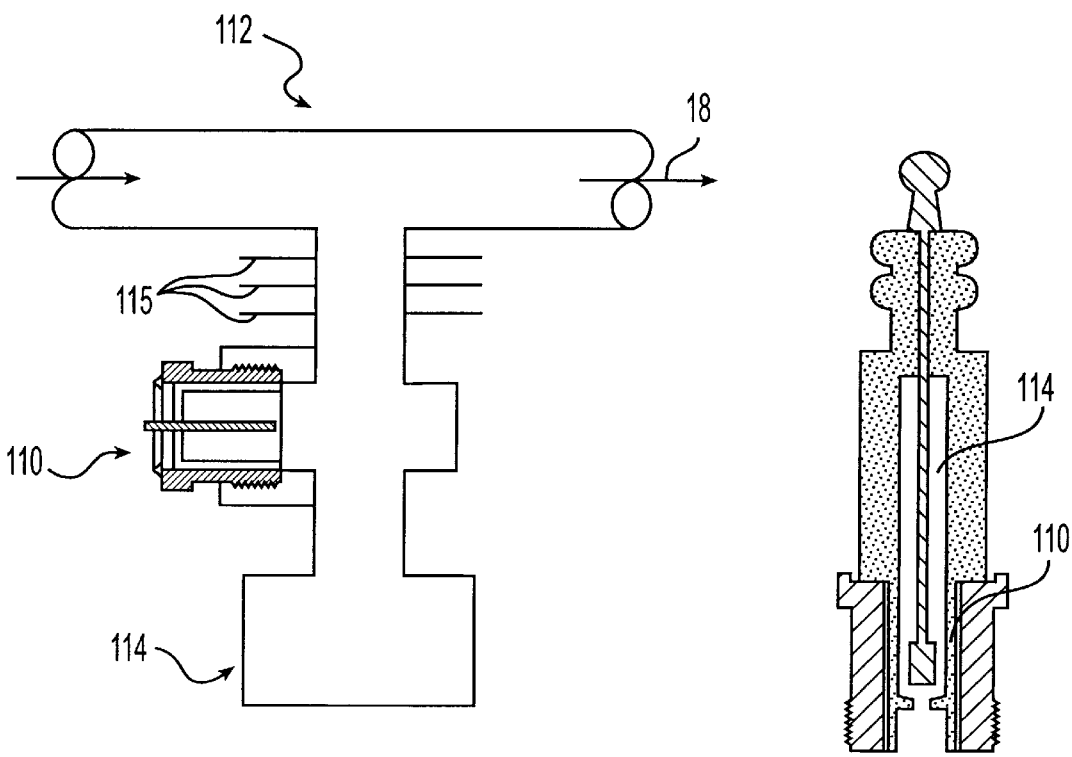
FIGS. 12a and 12b illustrate corona discharge devices mounted in conjunction with or incorporating a plenum that augments the pumping action of pressure variations in the exhaust gas stream.

Under normal operating conditions, the engine produces exhaust gas pressure oscillations having a frequency of about 30 to about 100 Hz and a peak to peak variation of about 20 to about 80%, depending upon the location in the exhaust system. These pressure oscillations in conjunction with the ullage volume 88 provide an effective, continuous pumping action of the radicals and other species produced in the corona discharge into the exhaust stream. The pumping effect of the exhaust gas pumping oscillations for any of the corona discharge devices described above, where the discharge device 110 is installed at a point on the exhaust pipe 112 where the oscillations occur, in the manner shown in FIG. 11, where the discharge device 110 is mounted on a simple "T" 113 off the side of the exhaust pipe 112. The pumping effect and the total gas motion can be augmented with a plenum 114 as shown in FIGS. 12a and 12b. As shown in FIG. 12a, the plenum 114 may be a separate extension of the exhaust pipe that is adjacent to the corona discharge device. Alternatively, the plenum 114 may be incorporated into the corona discharge device, as shown in FIG. 12b, such that high pressure oscillations in the exhaust force a portion of the exhaust gas past the corona discharge into the plenum, and low pressure oscillations in the exhaust force exhaust result in the exhaust gas in the plenum returning to the main exhaust gas stream enriched with radicals and other active species. In addition, cooling fins 115 may be added to lower the operating temperature for the discharge device 110. As noted above, a cooler operating environment improves the efficiency of the corona discharge.

It should be noted that the only requirement of the preceding embodiments of the present invention is that free radicals or gaseous and active oxidizing species, in particular, hydroxyl radical, are added to the combustion gas stream at a point upstream of or at the catalytic converter, for example, the air intake duct to the carburetor or fuel-injection systems of the combustion chamber, the air/fuel intake manifold to the combustion chamber, the combustion chamber directly or the exhaust manifold of the combustion chamber, or the exhaust pipe.

Moreover, while the present invention has been described in one embodiment with reference to a catalytic converter, it is contemplated that only the high surface area provided by those catalysts in conjunction with the introduction of hydroxyl radicals and other active species would be required to reduce the pollutants in the exhaust gases of a combustion engine.

Although the present invention has been described with particular reference to its preferred embodiments, it should be understood that many variations and modifications will now be obvious to those skilled in that art, and, therefore, the scope of the invention should not be limited by the specific disclosure herein, but only by the appended claims.

What is claimed:

1. An apparatus for enhancing the rate of a chemical reaction in a gas stream, the apparatus comprising:

at least one heterogeneous catalyst having an upstream end and a downstream end, and at least one surface having a plurality of catalytically active sites on the surface the catalyst positioned such that at least a portion of the gas stream contacts at least a portion of the catalytically active sites on the surface; and at least one device for producing radicals or other active species from at least one of water vapor or other gaseous species, such that the radicals or other active species are introduced into the gas stream at a position upstream of the downstream end of the catalyst, wherein the device for producing radicals comprises a corona discharge device comprising at least a first electrode, at least a second electrode positioned a distance from the first electrode, and a dielectric material positioned between the first electrode and the second electrode; and a high frequency power supply having an operational frequency of at least about 1,000 Hz adapted to provide electrical power to the corona discharge device, and at least a portion of the gas stream is exposed to the corona discharge to produce the radicals in the gas stream.

2. The apparatus of claim 1, wherein the at least one device for producing radicals or other active species is positioned within the gas stream, such that radicals are produced from at least one of water vapor or other gaseous species directly in the gas stream.

3. The apparatus of claim 1, wherein the radicals or other active species are introduced in an amount sufficient to reduce or eliminate poisoning of the catalyst by catalyst poisons.

4. The apparatus of claim 3, wherein the catalyst poison is sulfur, a sulfur containing compound, phosphorous, a phosphorous containing compound, or carbon.

5. The apparatus of claim 1, wherein the catalyst is a part of a fuel cell catalytic reactor, an automotive catalytic convertor, or a catalytic combuster.

6. The apparatus of claim 1, wherein the gas stream is an exhaust stream from an internal combustion engine.

7. The apparatus of claim 6, wherein the internal combustion engine is a stoichiometric engine.

8. The apparatus of claim 6, wherein the internal combustion engine is a lean burn engine.

9. The apparatus of claim 6, wherein the internal combustion engine is a diesel engine.

10. The apparatus of claim 6, further comprising a catalytic convertor, having an inlet and an outlet, and comprising the at least one catalyst, wherein the catalytic convertor is positioned such that at least a portion of the exhaust stream from the engine passes through the catalytic convertor.

11. The apparatus of claim 10, further comprising an exhaust pipe attached to the inlet of the catalytic convertor, such that at least a portion of the exhaust gas stream passes through the exhaust pipe to and through the catalytic convertor and the at least one catalyst, wherein at least one of the catalytic convertor or the exhaust pipe comprises a fitting for positioning a device for producing radicals or other active species in the exhaust stream or a portion thereof, so that a radicals or other active species are produced in the exhaust stream upstream of the downstream end of at least one catalyst in the catalytic convertor.

12. The apparatus of claim 10, wherein the at least one device for producing radicals or other active species is positioned on top of the exhaust pipe or catalytic convertor.

13. The apparatus of claim 10, wherein the corona discharge device and the power supply each have a mechanical natural resonant frequency significantly higher than that produced by the internal combustion engine.

14. The apparatus of claim 10, wherein the corona discharge device is positioned such that naturally occurring pressure fluctuations in the exhaust stream provide a pumping action that forces exhaust gas into the corona discharge device, and scavenges gases containing radicals produced in the corona discharge from the corona discharge device.

15. The apparatus of claim 14, further comprising a plenum positioned adjacent to the corona discharge device, such that exhaust gas pass from the exhaust pipe, through the corona discharge, into the plenum, and back into the exhaust pipe.

16. The apparatus according to claim 10, further comprising a device for injecting air into the exhaust stream during fuel rich cold start operating conditions, such that the corona discharge causes the oxidation of residual fuel in the exhaust stream.

17. The apparatus of claim 10, wherein the corona discharge device is a low power corona discharge device.

18. The apparatus of claim 17, further comprising a power supply producing no more than about 200 watts of power.

19. The apparatus of claim 17, further comprising a power supply producing no more than about 100 watts of power.

20. The apparatus of claim 17, further comprising a power supply producing no more than about 30 watts of power.

21. The apparatus of claim 10, further comprising
an exhaust pipe attached to the inlet of the catalytic convertor,
a tailpipe attached to the outlet of the catalytic convertor, such that at least a portion of the exhaust stream passes from the exhaust pipe to and through the catalytic convertor and through the tailpipe,
the tailpipe having an exhaust gas takeoff for conveying a portion of the exhaust stream to a remote radical generator, which comprises the at least one device for producing radicals or other active species in the exhaust gas in the portion of the exhaust stream conveyed to the remote radical generator, and
a remote radical generator output for returning the exhaust gas containing radicals or other active species from the remote radical generator to the exhaust stream at a point upstream of the downstream end of at least one catalyst in the catalytic convertor, where the exhaust gas containing radicals is injected into the exhaust stream.

22. The apparatus of claim 21, wherein the remote radical generator is configured and adapted for returning the exhaust gas containing radicals or other active species from the remote radical generator to the exhaust stream.

23. The apparatus of claim 1, wherein the gas stream has a direction of flow, the corona discharge device has a principal axis, and at least a portion of the corona discharge device is positioned within the gas stream, such that the principal axis is positioned at an angle to the gas stream direction of flow.

24. The apparatus of claim 23, wherein the corona discharge device is positioned such that the principal axis is substantially perpendicular to the gas stream direction of flow.

25. The apparatus of claim 1, wherein the radicals or other gaseous species are formed from water vapor or other gaseous species in the gas stream.

26. An apparatus for reducing at least one pollutant in an exhaust gas stream comprising exhaust gas formed from the combustion of fuel in a combustion gas stream, which comprises a precombustion gas stream and the exhaust gas stream, the apparatus comprising:
at least one catalyst, having an upstream end and a downstream end, where the at least one catalyst is positioned such that at least a portion of the exhaust gas stream passes through the at least one catalyst; and
at least one device for producing radicals or other active species from at least one of water vapor or other gaseous species positioned in the combustion gas stream, wherein the radicals are introduced into the combustion gas stream upstream of the downstream end of the at least one catalyst, wherein the device for producing radicals comprises a corona discharge device comprising at least a first electrode, at least a second electrode positioned a distance from the first electrode, and a dielectric material positioned between the first electrode and the second electrode; and
a high frequency power supply having an operational frequency of at least about 1,000 Hz adapted to provide electrical power to the corona discharge device, and
at least a portion of the gas stream is exposed to the corona discharge to produce the radicals in the gas stream.

27. The apparatus of claim 26, wherein the apparatus is a fuel cell catalytic reformer comprising:
a partial oxidation stage; a catalytic reactor stage, and a preferential oxidation stage, wherein at least one of the partial oxidation stage, catalytic reactor stage, or preferential oxidation stage comprises a catalyst.

28. The apparatus of claim 27, wherein the device for producing radicals or other active species is positioned within the gas stream.

29. The apparatus of claim 26, wherein the gas stream has a direction of flow, the corona discharge device has a principal axis, and at least a portion of the corona discharge device is positioned within the gas stream, such that the principal axis is positioned at an angle to the gas stream direction of flow.

30. The apparatus of claim 29, wherein the corona discharge device is positioned such that the principal axis is substantially perpendicular to the gas stream direction of flow.

31. The apparatus of claim 26, wherein the radicals or other gaseous species are formed from water vapor or other gaseous species in the gas stream.

32. A method of enhancing a gas phase chemical reaction in a gas stream, the method comprising:
contacting the gas stream with at least one heterogeneous catalyst having an upstream end, a downstream end, and at least one surface having a plurality of catalytically active sites, such that at least a portion of the gas stream contacts at least a portion of the catalytically active sites;
forming radicals or other active gaseous species using a corona discharge, produced by a corona discharge device, which comprises a first electrode, a second electrode positioned a distance from the first electrode, and a dielectric material positioned between the first electrode and the second electrode;
providing electrical power to the corona discharge device with a high frequency power supply having an operational frequency of at least about 1,000 Hz; and
introducing the radicals or other active gaseous species into the gas stream at a point upstream of the downstream end of the catalyst.

33. The method of claim 32, further comprising introducing the radicals or other active species into the gas stream whenever the gas stream is in contact with the catalyst.

34. The method of claim 33, further comprising providing power to the corona discharge device with a low power power supply.

35. The method of claim 34, further comprising providing a power to the corona discharge device during startup that is higher than the power used during normal operation.

36. The method of claim 35, wherein the catalyst poison is sulfur, a sulfur containing compound, phosphorous, a phosphorous containing compound, or carbon.

37. The method of claim 32, further comprising forming the radicals or other active gaseous species from at least one of water vapor or other gaseous species in the gas stream.

38. The method of claim 32, further comprising forming the radicals or other active gaseous species in a remote generator.

39. The method of claim 32, further comprising forming the radicals or other active species in an amount sufficient to reduce or eliminate poisoning of the catalyst by catalyst poisons.

40. The method of claim 32, further comprising introducing the radicals or other active species into the gas stream of a fuel cell catalytic reactor, an automotive catalytic convertor, or a catalytic combuster.

41. The method of claim 32, further comprising introducing the radicals or other active species into a fuel cell partial oxidation stage, catalytic reactor stage, or preferential oxidation stage.

42. The method of claim 32, wherein the gas stream is an exhaust stream from an internal combustion engine.

43. The method of claim 42, further comprising passing the exhaust stream through an exhaust pipe attached to an inlet of a catalytic convertor, wherein the catalytic convertor comprises the at least one catalyst.

44. The method of claim 42, further comprising forming the radicals or other active species in an amount sufficient to reduce or eliminate poisoning of the catalyst by catalyst poisons.

45. The method of claim 44, wherein the catalyst poison is sulfur, a sulfur containing compound, phosphorous, a phosphorous containing compound, or carbon.

46. The method of claim 42, further comprising forming the radicals or other active species in an amount sufficient to remove catalyst poisons from a poisoned catalyst.

47. The method of claim 42, further comprising diverting at least a portion of the exhaust gas stream, conveying the diverted exhaust gas stream to a remote generator, forming radicals or other active species in the diverted exhaust gas stream, and introducing the radicals or other active species into the gas stream.

48. The method of claim 32, further comprising forming the radicals or other reactive species from water vapor or other gaseous species in the gas stream.

49. An apparatus for enhancing the rate of a chemical reaction in a gas stream, the apparatus comprising:

at least one heterogeneous catalyst having an upstream end and a downstream end, and at least one surface having a plurality of catalytically active sites on the surface, the catalyst positioned such that at least a portion of the gas stream contacts catalytically active sites on the surface; and a corona discharge device for producing a corona discharge in the exhaust gas, the corona discharge device comprising at least one first electrode, at least one second electrode positioned a distance from the first electrode, and a dielectric material positioned between the first electrode and the second electrode;

wherein the apparatus is configured and adapted so that only a portion of the exhaust gas stream passes through the corona discharge to produce radicals from gaseous species in the exhaust gas stream, and the radicals are introduced into the exhaust gas stream at a point upstream of or at the catalytic convertor.

50. The apparatus of claim 49, wherein the gas stream has a direction of flow, the corona discharge device has a principal axis, and at least a portion of the corona discharge device is positioned within the gas stream, such that the principal axis is positioned at an angle to the gas stream direction of flow.

51. The apparatus of claim 50, wherein the corona discharge device is positioned such that the principal axis is substantially perpendicular to the gas stream direction of flow.

52. The apparatus of claim 49, wherein the radicals or other gaseous species are formed from water vapor or other gaseous species in the gas stream.

53. A method of enhancing a gas phase chemical reaction in a gas stream, the method comprising:

contacting at least a portion of the gas stream with at least one heterogeneous catalyst having an upstream end, a downstream end, and at least one surface having a plurality of catalytically active sites, such that the portion of the gas stream contacts at least a portion of the catalytically active sites;

passing only a portion of the gas stream through a corona discharge, produced by a corona discharge device, which comprises a first electrode, a second electrode positioned a distance from the first electrode, and a dielectric material positioned between the first electrode and the second electrode, thereby forming radicals or other active gaseous species; and introducing the radicals or other active gaseous species into the gas stream at a point upstream of the downstream end of the catalyst.

54. The method of claim 53, further comprising forming the radicals or other reactive species from water vapor or other gaseous species in the gas stream.

55. An apparatus for enhancing the rate of a chemical reaction in a gas stream, the apparatus comprising:

a three-way catalyst, having an inlet and an outlet, wherein the three-way catalyst is positioned such that at least a portion of the gas stream passes through the catalyst;

a corona discharge device for producing a corona discharge in the gas stream, the corona discharge device comprising at least one first electrode, at least one second electrode positioned a distance from the first electrode, and a dielectric material positioned between the first electrode and the second electrode; and a high frequency power supply having an operational frequency of at least about 1,000 Hz adapted to provide electrical power to the corona discharge device, wherein at least a portion of the gas stream is exposed to the corona discharge to produce radicals from gaseous species in the gas stream, and the radicals are introduced into the gas stream at a point upstream of or at the catalyst.

56. A method of enhancing a gas phase chemical reaction in a gas stream, the method comprising:

contacting at least a portion of the gas stream with at least one three-way catalyst having an upstream end, a downstream end, and at least one surface having a plurality of catalytically active sites, such that at least a portion of the gas stream contacts at least a portion of the catalytically active sites;

forming radicals or other active gaseous species using a corona discharge, produced by a corona discharge device, which comprises a first electrode, a second electrode positioned a distance from the first electrode, and a dielectric material positioned between the first electrode and the second electrode; and providing electrical power to the corona discharge device with a high frequency power supply having an operational frequency of at least about 1,000 Hz; and introducing the radicals or other active gaseous species into the gas stream at a point upstream of the downstream end of the three-way catalyst.

57. An apparatus for enhancing the rate of a chemical reaction in a gas stream, the apparatus consisting essentially of:

a catalyst, having an inlet and an outlet, wherein the catalyst is positioned such that at least a portion of the gas stream passes through the catalyst;

a corona discharge device for producing a corona discharge in the gas stream, the corona discharge device comprising at least one first electrode, at least one second electrode positioned a distance from the first electrode, and a dielectric material positioned between the first electrode and the second electrode; and a high frequency power supply having an operational frequency of at least about 1,000 Hz adapted to provide electrical power to the corona discharge device, wherein at least a portion of the gas stream is exposed to the corona discharge to produce radicals from gaseous species in the gas stream, and the radicals are introduced into the gas stream at a point upstream of or at the catalyst.

58. A method of enhancing a gas phase chemical reaction in a gas stream, the method consisting essentially of:

contacting at least a portion of the gas stream with at least one catalyst having an upstream end, a downstream end, and at least one surface having a plurality of catalytically active sites, such that at least a portion of the gas stream contacts at least a portion of the catalytically active sites;

forming radicals or other active gaseous species using a corona discharge, produced by a corona discharge device, which comprises a first electrode, a second electrode positioned a distance from the first electrode, and a dielectric material positioned between the first electrode and the second electrode; and providing electrical power to the corona discharge device with a high frequency power supply having an operational frequency of at least about 1,000 Hz; and introducing the radicals or other active gaseous species into the gas stream at a point upstream of the downstream end of the catalyst.

\* \* \* \* \*